(12) United States Patent
Chakrabarti et al.

(10) Patent No.: US 8,774,119 B2
(45) Date of Patent: *Jul. 8, 2014

(54) FAIR RESOURCE SHARING IN WIRELESS COMMUNICATION

(75) Inventors: Arnab Chakrabarti, San Diego, CA (US); Anastasios Stamoulis, San Diego, CA (US); Dexu Lin, San Diego, CA (US); Kambiz Azarian Yazdi, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/572,634

(22) Filed: Aug. 11, 2012

(65) Prior Publication Data

US 2012/0307765 A1  Dec. 6, 2012

Related U.S. Application Data

(63) Continuation of application No. 12/390,092, filed on Feb. 20, 2009, now Pat. No. 8,547,910.

(60) Provisional application No. 61/075,868, filed on Jun. 26, 2008.

(51) Int. Cl.
*H04W 28/16* (2009.01)
*H04W 16/14* (2009.01)
*H04W 72/00* (2009.01)
*H04W 72/12* (2009.01)
*H04L 29/08* (2006.01)

(52) U.S. Cl.
CPC .............. *H04W 16/14* (2013.01); *H04W 72/00* (2013.01); *H04W 72/12* (2013.01); *H04L 67/1082* (2013.01)
USPC ........................................ 370/329; 370/452.1

(58) Field of Classification Search
CPC ..... H04W 16/14; H04W 72/00; H04W 72/12; H04L 67/1082; H04L 12/145; H04Q 20/145
See application file for complete search history.

(56) References Cited

U.S. PATENT DOCUMENTS 5,943,316 A    8/1999  Davis
(Continued)

FOREIGN PATENT DOCUMENTS

CN    101170549 A    4/2008
(Continued)

OTHER PUBLICATIONS

Buttyan L et al., "Stimulating Cooperation in Self-Organizing Mobile Ad Hoc Networks", Mobile Networks and Applications vol. 8, No. 5, Oct. 31, 2004, pp. 579-592, XP002584335, ISSN: 1572-8153 DOI: 10.1023/A:1025146013151 Retrieved from the Internet: URL:http://www.springerlink.com/content/thh58318h3615x6p/> [retrieved on May 17, 2010] p. 579-p. 580.

(Continued)

*Primary Examiner* — Min Jung
(74) *Attorney, Agent, or Firm* — Nerrie M. Zohn

(57) ABSTRACT

Providing for fair resource sharing among wireless nodes in a wireless communication environment is described herein. By way of example, fairness can comprise establishing a set of resource sharing credits for wireless nodes. By expending credits, a node can borrow a resource of another node, to enable or enhance operation of the borrowing node. Credits for the borrowing node are decreased based on consumption of a shared resource, or credits for the lending node are increased based on such consumption, or both. Once an amount of credits expires, a node can be restricted from borrowing further resources until enough resources are lent to build up a suitable amount of credits. Accordingly, fairness can comprise correlating shared resource consumption with shared resource provisioning, to encourage participation in cooperative wireless communications.

18 Claims, 14 Drawing Sheets

(56) References Cited

U.S. PATENT DOCUMENTS

| | | | |
|---|---|---|---|
| 5,946,322 | A | 8/1999 | Moura et al. |
| 6,353,898 | B1 | 3/2002 | Wipfel et al. |
| 6,456,849 | B1 | 9/2002 | Purnadi et al. |
| 6,980,511 | B1 | 12/2005 | Li et al. |
| 6,981,259 | B2 | 12/2005 | Luman et al. |
| 7,113,771 | B2 | 9/2006 | Kotzin |
| 7,360,219 | B2 | 4/2008 | Rhine |
| 7,552,870 | B2 * | 6/2009 | Jones ............................ 235/380 |
| 7,937,362 | B1 * | 5/2011 | Lian et al. ..................... 707/622 |
| 2003/0026222 | A1 | 2/2003 | Kotzin |
| 2003/0236890 | A1 | 12/2003 | Hurwitz et al. |
| 2004/0037306 | A1 | 2/2004 | Khan et al. |
| 2006/0223448 | A1 | 10/2006 | Kruys et al. |
| 2007/0026857 | A1 | 2/2007 | Kotzin |
| 2007/0115817 | A1 | 5/2007 | Gupta et al. |
| 2007/0198984 | A1 | 8/2007 | Favor et al. |
| 2007/0264986 | A1 | 11/2007 | Warrillow et al. |
| 2007/0274288 | A1 | 11/2007 | Smith et al. |
| 2008/0112337 | A1 | 5/2008 | Shaffer et al. |
| 2008/0186942 | A1 | 8/2008 | Nakayasu |
| 2008/0287142 | A1 * | 11/2008 | Keighran ................... 455/456.5 |
| 2008/0320140 | A1 | 12/2008 | Simard et al. |
| 2009/0059856 | A1 | 3/2009 | Kermoal et al. |
| 2009/0276342 | A1 | 11/2009 | Goyal et al. |
| 2009/0323640 | A1 | 12/2009 | Chakrabarti et al. |
| 2010/0202305 | A1 | 8/2010 | Wijting et al. |

FOREIGN PATENT DOCUMENTS

| | | |
|---|---|---|
| EP | 1742497 A1 | 1/2007 |
| JP | 2005513931 A | 5/2005 |
| JP | 2008547356 A | 12/2008 |
| JP | 2009500906 A | 1/2009 |
| KR | 20060132639 A | 12/2006 |
| RU | 2006108518 A | 7/2006 |
| WO | 2005018269 A1 | 2/2005 |
| WO | 2007005181 A2 | 1/2007 |
| WO | 2007005182 A2 | 1/2007 |

OTHER PUBLICATIONS

Crowcroft J, et al., "Modelling Incentives for Collaboration in Mobile Ad Hoc Networks", vol. 57, Nr.4, pp. 427-439, May 24, 2004 XP002584334, Performance Evaluation,Amsterdam, NL-ISSN 0166-5316.

Ileri O et al., "Pricing for enabling forwarding in self-configuring ad hoc networks", Wireless Communications and Networking Conference, 2004. WCNC. 2004 IEEE Atlanta, GA, USA Mar. 21-25, 2004, Piscataway, NJ, USA.IEEE, vol. 2, Mar. 21, 2004, pp. 1034-1039, XP010708430, ISBN: 978-0-7803-8344-9 abstract section II.B.

International Search Report and Written Opinion—PCT/US2009/036422—ISA/EPO—Jun. 15, 2010.

Taiwan Search Report—TW098107422—TIPO—Sep. 4, 2013.

* cited by examiner

FAIR RESOURCE SHARING IN WIRELESS COMMUNICATION

CLAIM OF PRIORITY UNDER 35 U.S.C. §119 AND §120

The present application is a Continuation application of U.S. Ser. No. 12/390,092, filed Feb. 20, 2009, entitled FAIR RESOURCE SHARING IN WIRELESS COMMUNICATIONS, which claims priority to Provisional Application No. 61/075,868 entitled FAIR RESOURCE SHARING IN COOPERATIVE SYSTEMS filed Jun. 26, 2008, assigned to the assignee hereof and hereby expressly incorporated by reference herein.

BACKGROUND

I. Field

The following relates generally to wireless communication, and more specifically to providing fairness in sharing resources among wireless modes in a wireless communication environment.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can concurrently support communication for multiple user terminals. Mobile devices respectively can communicate with one or more base stations via transmissions on forward and reverse links. The forward link (or downlink) refers to a communication link from base stations to user terminals, and the reverse link (or uplink) refers to a communication link from user terminals to base stations. Further, communications between user terminals and base stations can be established via single-input single-output (SISO) systems, multiple-input single-output (MISO) systems, multiple-input multiple-output (MIMO) systems, and so forth.

In addition to the foregoing, ad-hoc wireless communication networks enable communication devices to transmit, or receive information while on the move and without the need for traditional base stations. These communication networks can be communicatively coupled to other public or private networks, for example via wired or wireless access points, in order to facilitate transfer of information to and from user terminals. Such ad-hoc communication networks typically include a plurality of access terminals (e.g., mobile communication devices, mobile phones, wireless user terminals), communicating in a peer-to-peer fashion. The communication networks may also include beacon points that emit strong signals to facilitate peer-to-peer communication amongst access terminals; for example, emitted beacons can contain timing information to aid in timing synchronization of such terminals.

Wireless communications generally involves multiple wireless transceivers, within a particular geographic area, transmitting signals on particular radio frequencies. Interference between signals of multiple transceivers can result when nearby transceivers transmit on common frequencies, at common times, or employing common codes or symbols (e.g., utilizing common wireless resources). To mitigate overlapping transmissions and resulting signal interference, wireless communications are typically structured in time, frequency, or on various code or symbol resources, to enable signals to be distinguished from other signals. For instance, transmitting at different times enables distinction, as well as transmitting on orthogonal frequencies. Furthermore, employing orthogonal codes or symbols can also yield mitigated interference, even for signals transmitted at a common point in time. Thus, wireless resources are segmented to enable multiple nodes to operate in a given wireless environment.

Although multiple access systems employ various techniques to reduce interference and provide high quality communications (e.g., such as resource segmentation), as a number of transmitters in a wireless environment increases, the interference problem tends to reoccur. Accordingly, network communication controllers often require some nodes to yield channel resources (e.g., transmission time, transmission frequency) to other nodes where interference occurs. Such a determination can be based on a traffic priority, signaling priority, etc., of the respective nodes, or the like. Although such an arrangement can keep interference to a minimum, it can also result in delay or interruption for yielding nodes. Accordingly, improvement in managing large numbers of wireless transceivers in an environment with finite resources is a continuing goal in wireless operations design.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for implementing fairness in sharing resources among wireless nodes in a wireless communication environment. In some aspects of the disclosure, the implementation comprises establishing a set of resource sharing credits for wireless nodes. By expending credits, a node can borrow a resource of another node, to enable or enhance operation of the borrowing node. Credits for the borrowing node are decremented based on an amount of the resource consumed, or credits for the lending node are incremented based on the amount consumed, or both. Once an amount of credits expires, a node is unable to borrow further resources until enough resources are lent to build up the amount of credits associated with the node. Accordingly, the fairness implementation can provide a similar distribution of borrowing and lending for various nodes, by correlating an amount of resources that a node can borrow with an amount of resources the node lends out.

In one or more other aspects of the subject disclosure, fairness in resource sharing is implemented for both network-controlled and in peer-to-peer environments. In a network environment, wireless nodes can submit requests for shared resources, and advertise available resources for lending, to a trusted network entity. The network entity can manage an amount of credits for wireless nodes within a particular coverage area, enabling borrowing of resources if a pool of credits is sufficient, and incrementing or decrementing respective credit pools for wireless nodes that lend out or consume, respectively, shared resources. In the peer-to-peer environment, respective wireless nodes can maintain and update an amount of shared credits in a secure module (e.g., tamper resistant) of the wireless node(s). In one aspect, respective nodes can maintain respective records of consumed resources, incrementing credits for a lending node and decrementing credits for a borrowing node. In other aspects, a trusted third party (e.g., a network node or other wireless node passing a suitable security key to participant nodes) can receive and track sharing credits for peer-to-peer resource sharing, reducing overhead for the peer-to-peer devices and potentially increasing security of sharing credits.

In other aspects of the subject disclosure, provided is a method of sharing resources in a wireless network. The method can comprise employing a communication interface to obtain a network service request from a wireless communication apparatus. Additionally, the method can comprise employing one or more data processors to execute shared resource management instructions for the wireless apparatus. The instructions can cause the data processor(s) to initialize an amount of credits for the wireless apparatus upon obtaining the network service request and to update the amount of credits when the wireless apparatus shares a resource with, or employs a resource shared by, a disparate wireless node.

In one or more further aspects, disclosed is an apparatus that facilitates shared resources in wireless communications. The apparatus can comprise a set of processors for executing coded instructions, the coded instructions cause the processors to obtain and decode a network service request from a wireless communication apparatus. Additionally, the apparatus can comprise an accounting module that initializes and maintains amount of credits for the wireless apparatus in response to the network service request. Furthermore, the apparatus can comprise a mediation module that updates the amount of credits maintained by the accounting module if the wireless apparatus shares a resource with, or consumes a resource shared by, a second wireless node.

In other aspects, provided is an apparatus that facilitates sharing resources in a wireless network. The apparatus can comprise means for employing a wired or wireless communication interface to obtain a network service request from a wireless communication apparatus. Furthermore, the apparatus can comprise means for employing one or more data processors to initialize an amount of credits for the wireless apparatus upon obtaining the network service request. In addition, the apparatus can comprise means for employing the data processor(s) to update the amount of credits when the wireless apparatus shares a resource with, or employs a resource shared by, a disparate wireless node.

According to additional aspects, the subject disclosure provides at least one processor configured to facilitate sharing resources in a wireless network. The processor(s) can comprise a first module for obtaining a network service request from a wireless communication apparatus. Further, the processor(s) can comprise a second module for initializing an amount of credits for the wireless apparatus upon obtaining the network service request. Moreover, the processor(s) can comprise a third module for updating the amount of credits when the wireless apparatus shares a resource with, or employs a resource shared by, a disparate wireless node.

According to yet other aspects, the subject disclosure provides a computer program product comprising a computer-readable medium. The computer-readable medium can comprise a first set of codes for causing a computer to obtain a network service request from a wireless communication apparatus. In addition, the computer-readable medium can comprise a second set of codes for causing the computer to initialize an amount of credits for the wireless apparatus upon obtaining the network service request. Moreover, the computer-readable medium can comprise a third set of codes for causing the computer to update the amount of credits when the wireless apparatus shares a resource with, or employs a resource shared by, a disparate wireless node.

In other aspects of the subject disclosure, provided is a method for cooperative communication in a wireless communication environment. The method can comprise employing a wireless interface of a wireless access terminal (AT) to send or receive wireless communications. Further, the method can comprise employing a set of data processors to implement rules for resource sharing with a disparate wireless communication device. The rules for resource sharing can cause the processor(s) to manage a request for obtaining or providing a wireless communication resource from or to the wireless communication device, respectively and to facilitate revision of a data record of wireless sharing credits if shared resources are expended as a result of the request.

In additional aspects, provided is an apparatus operable in a wireless communication environment. The apparatus can comprise a wireless communication interface for transmitting or receiving wireless data. Additionally, the apparatus can comprise at least one data processor for analyzing wireless communication signals. Furthermore, the apparatus can comprise a sharing module that initiates a request to utilize a resource of a wireless communication apparatus, or obtains a request to utilize a resource of the apparatus. The apparatus can also comprise a mediation module that facilitates tracking of resources consumed or provided by the apparatus.

Further to the above, the subject disclosure provides for an apparatus for cooperative communication in a wireless communication environment. The apparatus can comprise means for employing a wireless interface of a wireless AT to send or receive wireless communications. Furthermore, the apparatus can comprise means for employing a set of data processors to manage a request for sharing a wireless communication resource between the apparatus and a wireless communication device. In addition, the apparatus can comprise means for facilitating revision of a data record of wireless sharing credits if shared resources are expended as a result of the request.

According to still other aspects, disclosed is at least one processor configured for cooperative communication in a wireless communication environment. The processor(s) can comprise a first module that sends or receives wireless communications and a second module that manages a request for obtaining or providing a wireless communication resource from or to the wireless communication device, respectively. Moreover, the processor(s) can comprise a third module that facilitates revision of a data record of wireless sharing credits if shared resources are expended as a result of the request.

According to yet other aspects, the disclosure provides for a computer program product comprising a computer-readable medium. The computer-readable medium can comprise a first set of codes for causing a computer to send or receive wireless communications. The computer-readable medium can further comprise a second set of codes for causing the computer to manage a request for sharing a wireless communication resource between the computer and a wireless communication device. Additionally, the computer-readable medium can comprise a third set of codes for causing the computer to facilitate revision of a data record of wireless sharing credits if shared resources are expended as a result of the request.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the

DETAILED DESCRIPTION

Figure 1:
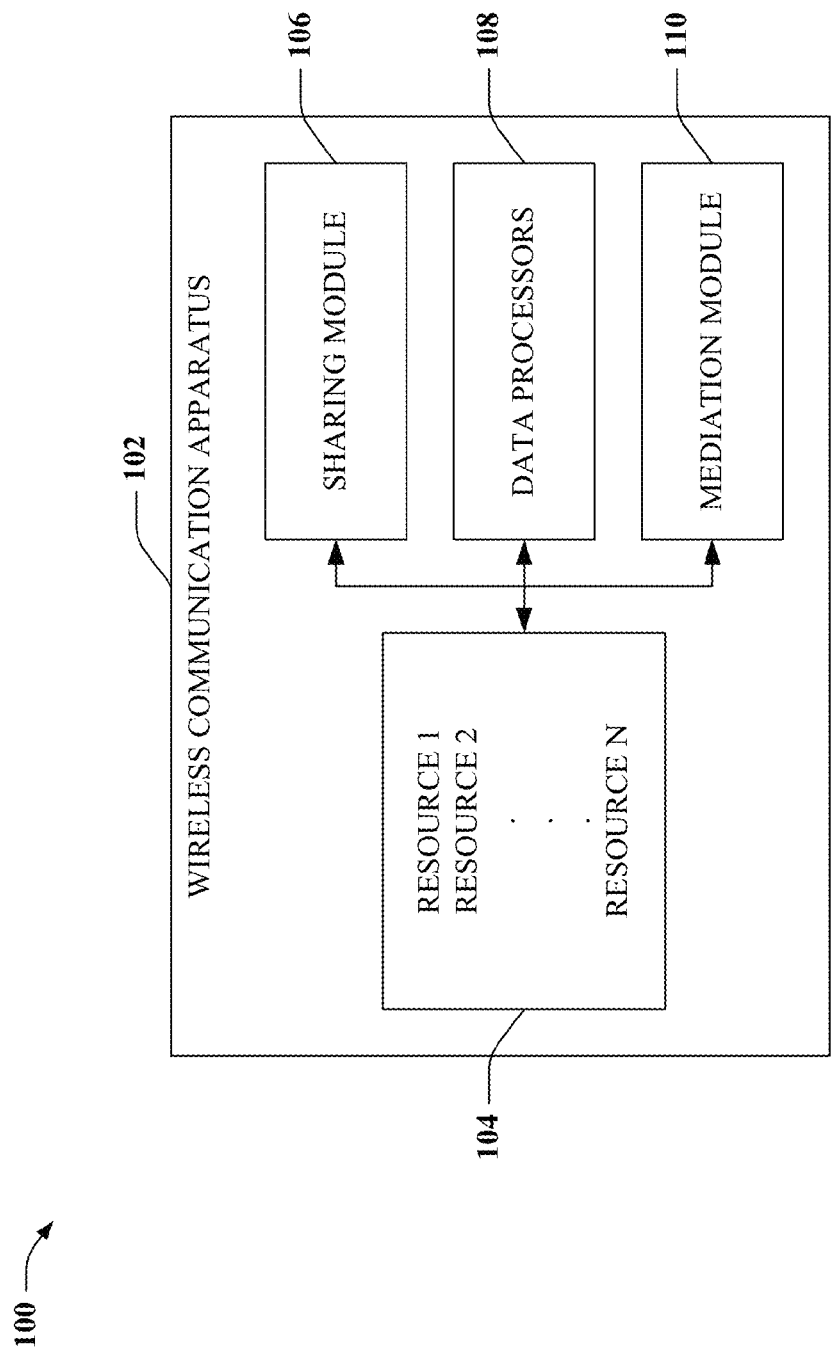
FIG. 1 depicts a block diagram of an example apparatus that provides fair resource sharing in a wireless network according to aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing fairness in sharing resources among wireless nodes in a wireless network. One skilled in the art should appreciate that similar techniques could apply to other communication environments.

In wireless communications, various mechanisms exist to distribute a finite set of wireless resources to multiple participating wireless nodes. For instance, orthogonal frequency division multiple access (OFDMA) enables multiple users to transmit traffic concurrently, while mitigating interference, by assigning distinct frequency sub-carriers to traffic of the respective users. Similarly, code division multiple access (CDMA) employs orthogonal codes to enable concurrent transmission from multiple devices, while mitigating interference among the transmissions. Other systems, such as orthogonal frequency division multiplex (OFDM) systems, time division multiple access (TDMA) systems, or the like, employ different mechanisms to enable multiple user terminals (UTs) to employ a finite set of wireless channel resources, while mitigating interference between the UTs.

In addition to the foregoing, multiple access systems can employ additional techniques to enable sharing of finite channel resources. For instance, one set of nodes can be instructed to transmit at reduced power to reduce interference for another set of nodes. Mediation between transmit power of various nodes can be implemented, for instance, based on priority of traffic flows of the respective nodes. High quality traffic, or high sensitivity traffic, etc., can be given higher priority over lower quality/sensitivity traffic. In such a manner, a transmit power resource is allocated to respective wireless nodes based on priority of the traffic. Although this enables higher priority traffic to be more reliable, it can also degrade performance of the lower priority traffic. In some circumstances, allocation of resources based on priority can be acceptable, but in many circumstances (e.g., multiple high quality traffic streams) conflict can arise. Accordingly, distribution of resources can still be a problem for one or more nodes.

Further to the above, advanced wireless systems (e.g., third generation partnership project long term evolution [3GPP-LTE, or LTE], peer-to-peer wireless communication systems, virtual multiple input multiple output [MIMO] systems) or future generation wireless systems anticipate user-cooperation with respect to finite channel resources, network resources or even node resources (e.g., memory, processing power, licenses, restricted applications, shared applications, etc.). By combining resources, wireless nodes can realize additional efficiency or effectiveness in wireless communications. Further, because typical nodes often spend significant time in an inactive or low activity state—not actively engaged in voice or data traffic communication—it is feasible for resources to be utilized more fully by nodes that are active at a given point in time.

In a general sense, cooperation can refer to network or peer directed sharing of wireless channel resources, such as frequency, timeslot, codes, symbols, or transmit power. In other aspects, cooperation can comprise wireless nodes relinquishing network-assigned resources to other such nodes (e.g., sharing network-assigned bandwidth with another node(s)). In still other aspects, cooperation can comprise sharing of channel or physical resources in peer-to-peer communication (e.g., direct communication between two UTs). In a peer-to-peer environment, channel resources can comprise joint transmission or reception in a virtual MIMO-type arrangement (e.g., where a UT assists in transmitting or receiving multiple iterations of a traffic signal to achieve multi-antenna gains), or serving as a wireless relay for communications of another node, or the like. Physical resources, on the other hand can comprise storage space, processor cycles, etc., of a physical wireless device.

One class of cooperative system comprises systems in which nodes provide resources to other nodes in anticipation of receiving a fair return of other resources in the future. Where resources are shared indiscriminately, however, it is possible for one node to employ a much greater degree of resources than others, leading to unfair distribution of resources. Because many nodes (e.g., mobile phones) are associated with subscription services, users may desire receipt of shared resources in proportion to resources loaned out. Accordingly, a system of fairness can make resources sharing more acceptable to some users.

To address some concerns regarding shared resources, the subject disclosure provides a set of rules (e.g., a protocol) for governing resource sharing among wireless nodes of a wireless network. In some aspects, nodes can be rewarded when providing giving up a resource to aid another node. In other aspects, nodes can be penalized for refusing to grant shared resources. In still other aspects, a combination of the foregoing rules can be implemented.

One example set of rules for governing sharing of wireless-related resources can comprise allocation of sharing credits based on resources shared with other wireless devices. As utilized herein, a sharing credit is a requisite for obtaining cooperation from other wireless nodes. An amount of credits can be correlated with an amount of shared resources permitted for consumption, to facilitate relative equality in sharing and consumption of such resources. Thus, as one particular example, a credit can be correlated to a number of mobile-minutes. A wireless node having sixty mobile-minute credits could seek cooperation (e.g., consume shared resources) from other wireless nodes for a total of sixty minutes before expending all of the credits. Thus, a resource of a first mobile can be utilized for ten minutes, and a resource of a second mobile can be utilized for fifty minutes, or some other suitable combination of sixty mobile-minutes. Nodes providing the shared resources can earn mobile-minute credits for each minute (or fraction thereof in some) of shared cooperation, in which a resource is consumed by a recipient node. To extend the foregoing example, a mobile might accumulate one hundred mobile minutes by providing shared resources to the first wireless node for ten minutes, and to the second wireless node for ninety minutes, or some other suitable combination of one hundred. It should be appreciated, however, that the subject disclosure is not limited in scope to this specific example.

According to further aspects of the subject disclosure, a node can be given a number of credits when entering a network. In some aspects, the number of credits can be a fixed number, common to all entering nodes. In other aspects, the number of credits can be variable on one or more factors. Suitable factors can include a level of a tiered subscription plan (e.g., more expensive or premier plans can be associated with more initial credits), degree of past mobile cooperation in the network, or the like. A record of credits for each node within a network can be maintained and updated after cooperative communication by a trusted, unbiased entity or entities. For instance, a network server can be employed to facilitate unbiased recordation of sharing credits. In other examples (e.g., a peer-to-peer environment), a wireless node can maintain and update recordation of sharing credits based on cooperative communication involving that node. In at least one aspect, wireless nodes have suitable security provisions to prevent tampering and provide reliability in correlating amounts of sharing credits to actual cooperative communication. In yet other examples, a wireless node having a suitable security module (e.g., to prevent tampering) can provide credit management for surrounding nodes. Other examples are possible within the scope of the subject disclosure, however.

According to some aspects of the subject disclosure, different resources can have different corresponding credit values, based on availability or demand for the respective resources in a particular environment. Thus, for instance, where bandwidth is scarce, shared bandwidth can result in a premium cost in the amount of credits expended in consuming shared bandwidth. Conversely, where network loading is light, shared bandwidth can have a nominal cost, or even a reduced cost.

A protocol that provides fairness in sharing resources among wireless nodes is helpful to prevent unbalanced lending/borrowing of resources. For instance, absent some correlation between reaping benefits from other nodes (e.g., borrowing resources) and providing benefits in return (e.g., loaning resources, paying higher subscription rates, etc.), respective nodes (and their users) may be discouraged from participating in sharing wireless resources. Accordingly, providing some protocol for fairness in resource sharing can help to boost participation in a cooperative environment, increasing the benefits to participants.

In addition to the foregoing, particular problems can arise in cooperative environments, based on specific circumstances. For instance, a mobile device user whose device has low battery power may not wish to participate in shared resources (or, e.g., share resources affecting battery life of the mobile device) until the mobile device can be plugged into a constant power source. As another example, if the user is anticipating or engaged in an important phone call requiring high bandwidth or high quality of service (QoS), the user may not wish to degrade performance of the call be sharing resources with other mobiles, and reducing the resources applicable for the high bandwidth/QoS call. Accordingly, in at least some aspects of the subject disclosure, resource sharing can be enabled or disabled by a user. For instance, a user-flag maintained on the mobile device can be set to sharing active or sharing inactive, or the like. Prior to approving shared resources, a network or device can check and determine a state of the user-flag, conditioning sharing resources on the state. Thus, in at least some aspects of the subject disclosure, a device user can override sharing protocols to adapt to specific needs and circumstances. As utilized herein, the term user-flag (or alternatively referred to as user-resource flag, user-authorization flag, and so forth) refers to a setting maintained by a user terminal or on a network user account, or both, that can enable or disable resource sharing. In some aspects, the user-flag can selectively enable or disable resource sharing, for instance, specifying particular resources, particular partner nodes, particular times, particular types of cooperative communication, or the like, for which sharing is enabled or disabled.

Turning to the figures, FIG. 1 depicts a block diagram of an example system 100 for facilitating fair resource sharing in wireless communications. System 100 can comprise a wireless communication apparatus 102. Wireless communication apparatus 102 can be substantially any type of wireless communication device such as, for instance, an access terminal, a base station, any disparate type of device, and the like. Further, wireless communication apparatus 102 can interact with one or more disparate wireless communication apparatuses (not shown, but see FIG. 2 or FIG. 4). For instance, wireless communication apparatus 102 can communicate or exchange data with disparate wireless communication apparatuses, share a resource(s) with differing wireless communication apparatuses, and so forth. Moreover, it is to be appreciated that wireless communication apparatus 102 can be a node within a network.

Future generation wireless systems envision use of user-cooperation to increase capacity and energy efficiency. An important class of cooperative systems includes systems where nodes (e.g., wireless communication apparatuses, . . . ) provide their resources in anticipation that they will receive fair return when required or beneficial. A cooperative system can make more efficient use of resources from an overall perspective; however, an ingredient in making cooperation viable is to ensure that users reap benefits in proportion to their contributions.

Wireless communication apparatus 102 can include any number of resources 104 (e.g., resource 1, resource 2, . . . , resource N, where N can be substantially any positive integer). Resources 104 can include network-assigned timeslot, frequency bandwidth, OFDM symbols, or CDMA codes of a wireless signal, power (e.g., transmit power, battery power), processor cycles, connectivity (e.g., connectivity period), licenses (e.g., licensed network or third party application), storage (e.g., memory, . . . ), inputs, outputs, and so forth; however, the claimed subject matter is not limited to the foregoing resource examples. Moreover, resources 104 can be employed by wireless communication apparatus 102 (e.g., to transmit data to and/or receive data from a second wireless communication apparatus, process data, effectuate commands, store data, collect data, output data, . . . ), shared with a third wireless communication apparatus which can use the borrowed resources 104 (e.g., where wireless communication apparatus 102 and the second or third wireless communication apparatus comprise a virtual multiple-antenna configuration, or where the wireless communication apparatus 102 acts as a communication or resource relay for the third wireless communication apparatus), and so forth.

Moreover, wireless communication apparatus 102 can include a sharing module 106, a set of data processors 108, and a mediation module 110. Data processor(s) 108 can be utilized to analyze wireless signals of one or more disparate wireless communication apparatuses. Such analysis can facilitate decoding communication signals, requests for resource sharing, or the like.

To facilitate cooperative communication between wireless communication apparatus 102 and a disparate wireless communication apparatus(es), sharing module 106 can initiate a request to utilize a resource of a disparate wireless communication apparatus, or obtain a request for use of a resource 104 of wireless communication apparatus 102 (such request decoded by processor(s) 108). In response to such a request of the disparate wireless communication apparatus, sharing module 106 can make one or more resources 104 available for use by such disparate apparatus. For instance, sharing module 106 can obtain user input to select a subset of resources 104 to make available or a subset of times to make resource(s) 104 available to other wireless communication apparatuses. By way of further illustration, sharing module 106 can collect user input related to identities of a subset of disparate wireless communication apparatuses permitted to borrow resource(s) 104. Alternatively, or in addition, sharing module 106 can check a status of a user-flag maintained by wireless communication apparatus 102 (e.g., in memory—not shown) in determining whether or what resource(s) 104 can be borrowed by the disparate wireless communication apparatus (es).

In addition to the foregoing, it is to be appreciated that various preset criteria can be used by sharing module 106 (e.g., in addition to or instead of employing user input) in connection with selectively making resources available for use by disparate wireless communication apparatuses (e.g., as a function of disparate wireless communication apparatus identity, time, resource type, resource availability, resource exhaustion, demand, utilization by wireless communication apparatus 102, trending data of historical use, . . . ). According to another illustration, sharing module 106 can notify disparate wireless communication apparatus(es) as to resource availability (e.g., such notification can be automatically sent to all wireless communication apparatuses in proximity, automatically transmitted to wireless communication apparatuses that subscribe to be automatically updated by wireless communication apparatus 102 as to its corresponding resource 104 availability, transferred upon sharing module 106 receiving a request from a disparate wireless communication apparatus, uploaded to a network providing network-managed resource sharing, . . . ).

Further to the above, sharing module 106 can cooperate with a disparate wireless communication apparatus (or more than one disparate wireless communication apparatus) to make use of resource(s) shared by the disparate wireless communication apparatus(es). Thus, if wireless communication apparatus 102 needs or can benefit from a resource(s) in addition to or other than resources 104, sharing module 106 can leverage resources made available by a disparate sharing module (e.g., a resource lender) of a disparate wireless communication apparatus. By way of example, if wireless communication apparatus 102 is an access terminal that has a diminished battery level, the access terminal can borrow power from a cooperating access terminal in the network to effectuate a task (e.g., where the cooperating access terminal performs traffic communication for wireless communication apparatus 102); it is to be appreciated, however, that the claimed subject matter is not so limited.

Further, wireless communication apparatus 102 can comprise a mediation module 110 that facilitates tracking of resources consumed or provided by wireless communication apparatus 102. To implement such tracking, mediation module 110 can implement a set of rules (e.g., a protocol, . . . ) that can ensure fairness associated with the aforementioned borrowing and lending of resources. The set of rules can either reward nodes (e.g., wireless communication apparatus 102, disparate wireless communication apparatus(es), . . . ) that give their resources (e.g., bandwidth, power, processing, memory, input and/or output capabilities, licenses, connectivity, . . . ) to aid in communication of other nodes' information or penalize nodes that refuse cooperation. According to another example, the set of rules leveraged by mediation module 110 can advocate both rewarding nodes that lend resources and penalizing nodes that refuse to lend resources.

Mediation module 110 can track credits corresponding to wireless communication apparatus 102. For instance, wireless communication apparatus 102 can earn credits when resources 104 are lent to a disparate wireless communication apparatus. Moreover, wireless communication apparatus 102 can spend credits when resource(s) of a disparate wireless communication apparatus are borrowed (e.g., via utilizing resource borrower 110, . . . ). Hence, when resource(s) of the disparate wireless communication apparatus are leveraged, mediation module 110 can deduct an amount of credits associated with wireless communication apparatus 102, or when resource(s) of wireless communication apparatus 102 are leveraged by the disparate wireless communication apparatus, mediation module 110 can increase an amount of credits associated with the wireless communication apparatus 102.

In some aspects of the subject disclosure, a credit can be like permission (e.g., a requisite) to obtain cooperation from other nodes. A node (102) can earn credits through giving cooperation, as described herein. Furthermore, the node (102) can expend credits by receiving cooperation from a disparate wireless apparatus, as described herein.

According to further aspects of the subject disclosure, if wireless communication apparatus 102 enters a network, the network can allocate a number of credits for use by wireless communication apparatus 102. By way of illustration, the number of credits allocated to wireless communication apparatus 102 upon network entry can be dependent upon a subscription level, credit history, sharing history, or other suitable factor.

In a network-managed sharing environment, a record of credits for wireless communication apparatus 102 and other wireless nodes served by the network can be maintained by a reliable, unbiased entity (which, e.g., can comprise mediation module 110 in addition to or in lieu of a network database). For example, in a traditional cellular system with cooperating mobiles, a base station can keep a record of the credits of each user terminal, and update the credits after each cooperative call. Nodes can also keep a record of their own credits locally (e.g., at mediation module 110) if tampering with this information is disabled.

Figure 2:
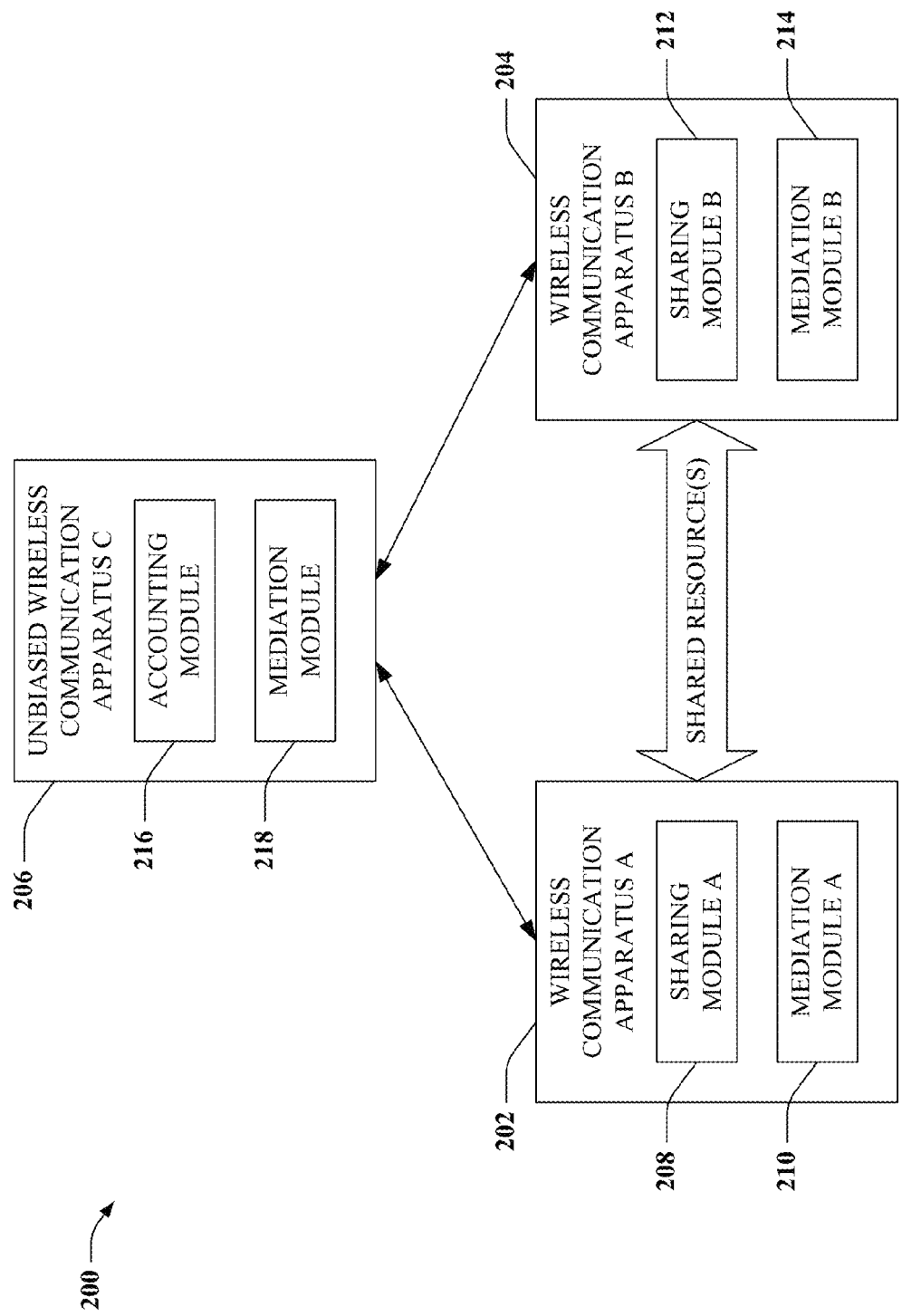
FIG. 2 illustrates a block diagram of a sample apparatus for network arbitration of wireless node resource sharing according to one or more aspects.

Now turning to FIG. 2, illustrated is a system 200 that can maintains a centralized record of credits of nodes in a cooperative wireless communication system. System 200 includes a wireless communication apparatus A 202 and a wireless communication apparatus B 204 (each of which, e.g., can be substantially similar to wireless communication apparatus 102 of FIG. 1). Moreover, system 200 can include an unbiased wireless communication apparatus C 206. According to an example, wireless communication apparatuses 202-204 can each be access terminals and unbiased wireless communication apparatus C 206 can be a base station; however, it is to be appreciated that the subject disclosure and claimed subject matter are not so limited. Further, although the example depicted in FIG. 2 shows two wireless communication apparatuses 202-404 and one unbiased wireless communication apparatus C 206, it is to be appreciated that system 200 can support any suitable number of wireless communication apparatuses similar to wireless communication apparatuses 202-404 or any suitable number of unbiased wireless communication apparatuses similar to unbiased wireless communication apparatus C 206.

Wireless communication apparatus A 202 can further include a sharing module 208 and a mediation module 210 (as well as any number of respective resources (not shown)) and wireless communication apparatus B 204 can further comprise a sharing module B 212 and a mediation module B 214 (as well as any number of respective resources (not shown)). It is to be appreciated that sharing module A 208 and sharing module B 212 can each be substantially similar to sharing module 106 of FIG. 1, and mediation module A 210 and mediation module B 214 can each be substantially similar to mediation module 110 of FIG. 1. Moreover, unbiased wireless communication apparatus C 206 can include an accounting module 216 and a mediation module 218, which, in some aspects, can be substantially similar to accounting module 106 and mediation module 110, respectively, of FIG. 1. In other aspects, accounting module 216 and mediation module 218 can be configured for managing resource sharing for wireless nodes (202, 204) of a wireless network, as described below.

Wireless communication apparatuses 202 can share resources there between. Thus, for example, sharing module A 208 of wireless communication apparatus A 202 can make one or more resources available for use by sharing module B 212 of wireless communication apparatus B 204, and vice versa. Further, sharing module B 212 of wireless communication apparatus B 204 can use at least one of the resources made available by wireless communication apparatus A 202. Although not shown, wireless communication apparatus A 202 or wireless communication apparatus B 204 can borrow or lend resources to any disparate wireless communication apparatus(es) (not shown).

In one example, lending of resources for wireless communication apparatus A 202 or wireless communication apparatus B 204 can be effectuated so long as the respective wireless communication apparatus 202, 204 has a sufficient amount of available credits (e.g., as maintained by mediation module A 210 or mediation module B 216, respectively) to spend. For instance, as resources of wireless communication apparatus A 202 are borrowed by wireless communication apparatus B 204, an amount of credits associated with wireless communication apparatus A 202 can be increased by mediation module A 210 while an amount of credits associated with wireless communication apparatus B 204 can be decreased by mediation module B 214. Further, a record of credits of each wireless communication apparatus 202-204 can be maintained by mediation module 218 of unbiased wireless communication apparatus C 206. For example, unbiased wireless communication apparatus C 206 can be a base station, and thus, the record of credits can be managed by the base station; however, the subject disclosure and claimed subject matter are not so limited (e.g., unbiased wireless communication apparatus C 206 can be any disparate node within a network such as an unbiased, third party access terminal, . . . ). According to the illustrated example, the record of credits can be managed in a common location and updated after each cooperative call between wireless communication apparatuses 202-404.

In accordance with another example, unbiased wireless communication apparatus C 206 can provide network-managed resource sharing. In such example, accounting module 216 can initialize and maintain a record of credits for wireless communication apparatus A 202 and a record of credits for wireless apparatus B 204. Initialization can comprise, for instance, allocating respective storage for the respective wireless communication apparatuses 202, 204 for recording a current amount of credits allocated to each apparatus 202, 204. Additionally, the mediation module 218 can update the respective amounts of credits based on shared resources between the wireless communication apparatus A 202 and the wireless communication apparatus B 204 (e.g., by increasing credits for an apparatus providing shared resources or decreasing credits for an apparatus consuming the shared credits).

Further, upon obtaining requests to loan resources to a disparate wireless communication apparatus, sharing modules 208, 212 can query accounting module 216 of unbiased wireless communication apparatus C 206 to determine whether the requesting disparate wireless communication apparatus has sufficient credits in its corresponding account. Based upon this query, sharing modules 208, 212 can accept or deny the loan requests.

Figure 3:
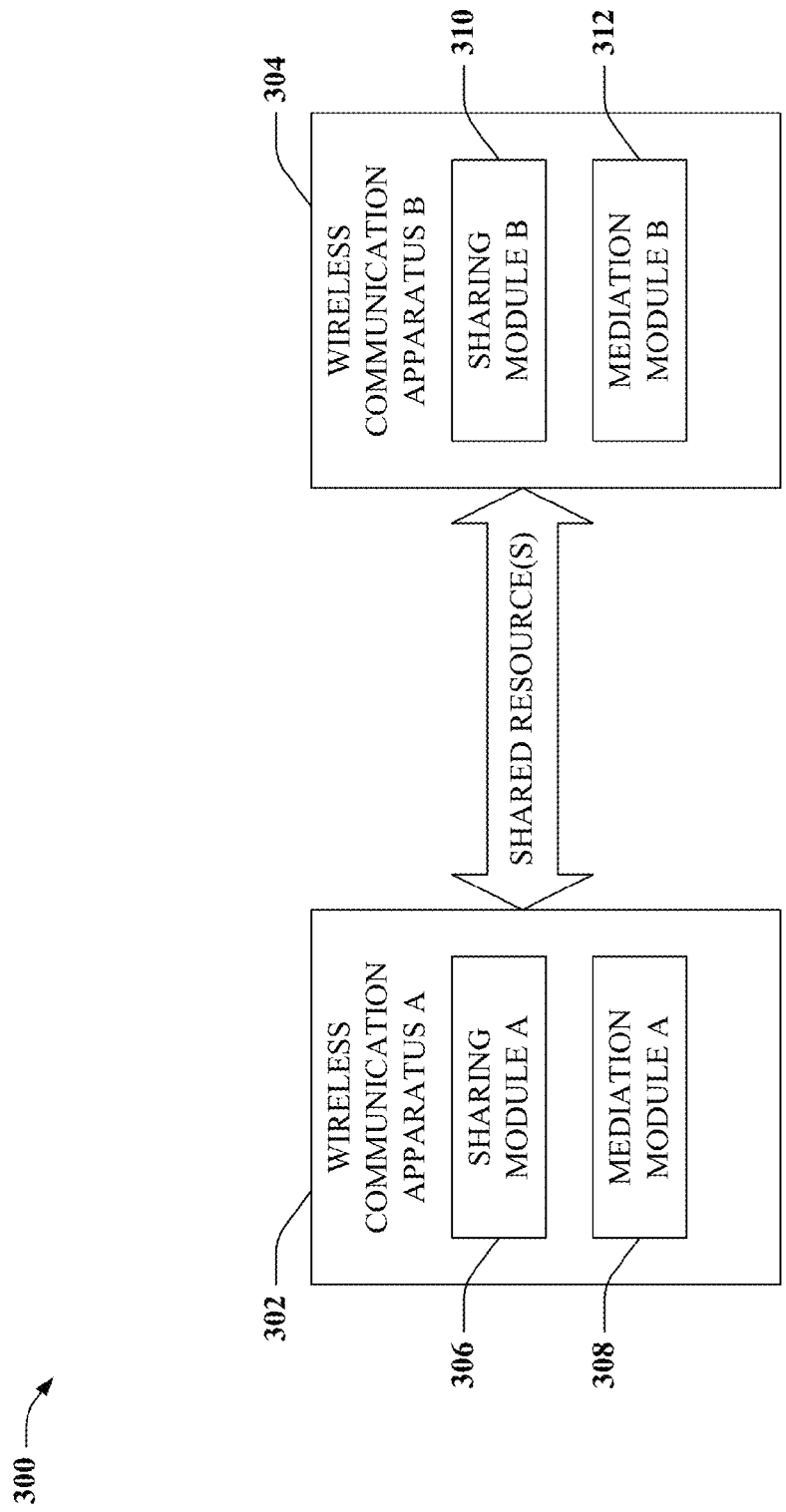
FIG. 3 depicts a block diagram of an example apparatus for peer-to-peer resource sharing in a wireless network, according to further aspects.

Referring to FIG. 3, illustrated is a system 300 that employs credits for a cooperative peer-to-peer resource sharing environment. System 300 includes wireless communication apparatus A 302 (e.g., which further includes sharing module A 306) and wireless communication apparatus B 304 (e.g., which further includes sharing module B 310) as described herein. Moreover, wireless communication apparatus A 302 can include a mediation module A 308 and wireless communication apparatus B 404 can include a mediation module B 312.

In contrast to system 200 of FIG. 2 which can employ a commonly maintained record of credits at an unbiased wireless communication apparatus for a plurality of wireless nodes participating in resource sharing, system 300 can employ locally managed records of credits for each wireless communication apparatus 302, 304. Respective mediation modules 302-304 of wireless communication apparatuses 302-304 can keep a record of credits at one apparatus (302, 304) or can keep their respective credits locally (e.g., at respective mediation modules 308, 312).

Further, each mediation module 308-312 can include a respective mechanism to mitigate tampering with such credit records. Such a mechanism can comprise secure memory and secure processing employed by the respective mediation components 308, 312. Examples can include encrypted memory and processing, hard-coded memory storing a key for encryption, where such key is employed to encode respective amounts of credits stored in memory (not shown), hard-coded rules for accounting and updating credits that do not provide access to other operations of the respective wireless communication apparatuses 302, 304, or the like.

Figure 4:
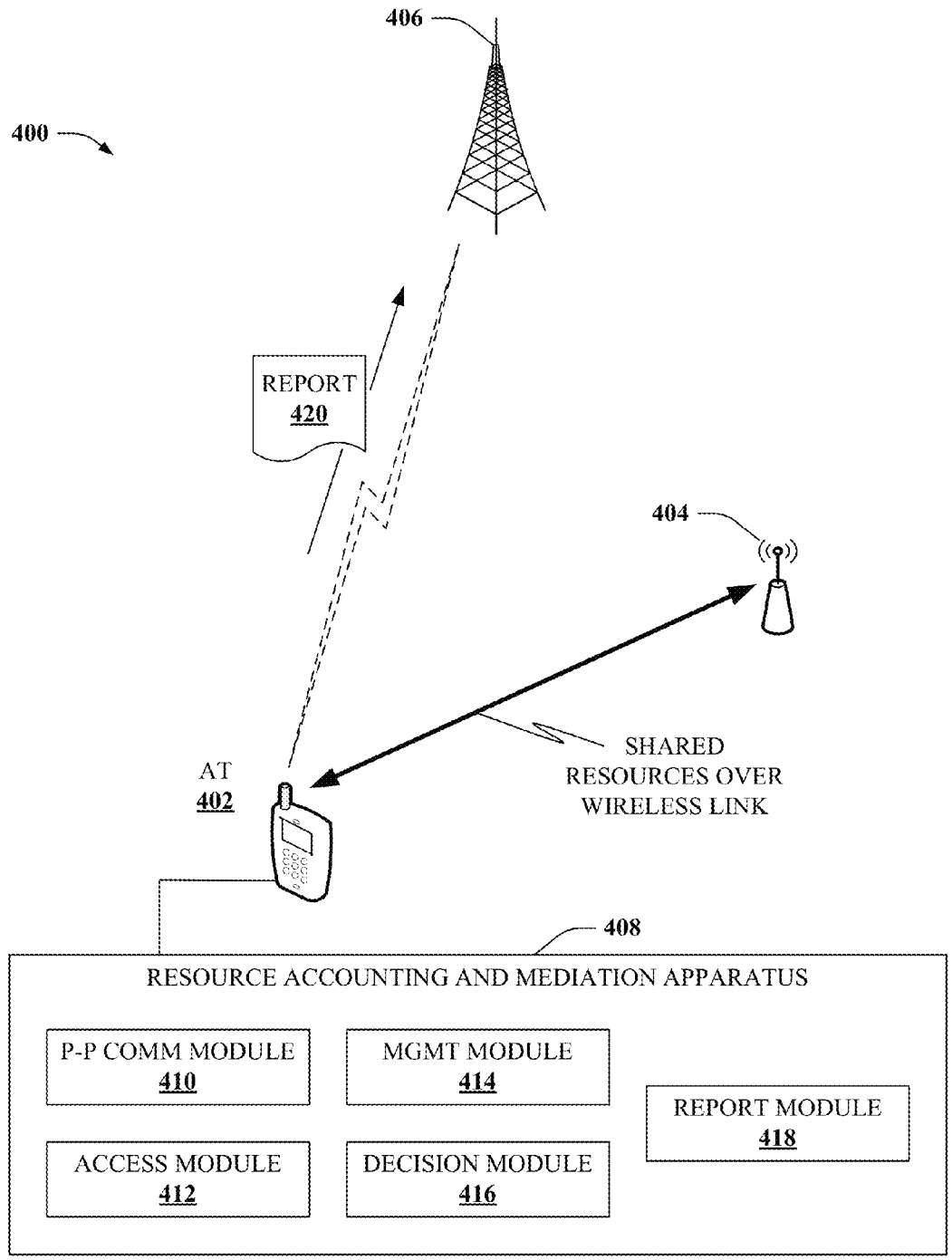
FIG. 4 depicts a block diagram of a sample apparatus for peer-managed resource sharing and network reporting according to at least one aspect.

FIG. 4 illustrates a block diagram of an example system 400 facilitating resource sharing in a wireless communication environment. System 400 can comprise an access terminal (AT) 402, communicatively coupled with a wireless communication apparatus 404. Additionally, the AT 402 can maintain a wireless communication link with a base station 406 of a wireless communication network (not shown). It should be appreciated that in at least some aspects of the subject disclosure, AT 402 can be substantially similar to wireless communication apparatus 102 of FIG. 1. Further, in such aspects, wireless communication apparatus 404 can be substantially similar to wireless communication apparatus B 204 of FIG. 2. Moreover, it should be appreciated that base station 406 can be substantially similar to unbiased wireless communication apparatus 206 of FIG. 2 in such aspects.

As depicted, AT 402 can comprise a resource accounting and mediation apparatus 408 (apparatus 408). Such apparatus 408 can facilitate resource sharing between AT 402 and wireless communication apparatus 404. For instance, apparatus 408 can communicate with one or more wireless communication devices (404, 406) to identify resources available for sharing. Additionally, apparatus 408 can identify resources of AT 402 that are available for consumption by other wireless communication devices (404, 406) in cooperative communication. Further to the above, apparatus 408 can record resources consumed or provided by AT 402 in cooperative communication, and maintain a record of credits corresponding to the resources consumed/provided. As one example, by increasing or decreasing credits associated with AT 402, apparatus 408 can correlate consumption of shared resources with provision of shared resources, to provide fairness for the cooperative communication.

Apparatus 408 can comprise a peer-to-peer communication module 410 to facilitate direct communication (or, e.g., indirect communication employing a wireless repeater or relay) between AT 402 and a disparate peer device (e.g., another AT). Thus, in some aspects of the subject disclosure, the wireless communication apparatus 404 can be a second AT, a computer or laptop computer comprising a wireless interface, a mobile phone, or some other suitable user device. The peer-to-peer module 410 can facilitate transmitting or receiving data with the wireless communication apparatus 404, either on an uplink channel (or forward link) or a downlink channel (or reverse link), or both, to facilitate the peer-to-peer communication. In at least one aspect, the peer-to-peer communication module 410 can employ a common reference signal (e.g., timing signal) broadcast by base station 406 to facilitate data exchange with the wireless communication apparatus 404.

In addition to the foregoing, apparatus 408 can comprise an access module 412 that submits a request to utilize a resource of the wireless communication apparatus 404. The request can be in conjunction with a task performed by AT 402, such as voice or data communication, use of a network resource, application or service, or the like. In some aspects, the request submitted by access module 412 can be based on a resource demand related to the task, as compared with available resources of AT 402 (e.g., resources local to or allocated to AT 402 versus needed or optimal resources for the task). According to at least one aspect, the request can be conditioned on a status of a user-flag maintained by a decision module 416, indicating whether resource sharing is permitted, what resources can be shared (e.g., compared with the resource demand), when resources can be shared, or with what particular devices cooperative communication can be implemented.

Further to the above, apparatus 408 can comprise a resource management module 414 that directs resources provided to AT 402 by wireless communication apparatus for cooperative communication. The resource management module 414 can, for instance, identify particular resources of the wireless communication apparatus 404 available for sharing. Such identification can be peer-facilitated (e.g., sent in a message by the wireless communication apparatus 404 to AT 402 via peer-to-peer communication), or network-facilitated (e.g., uploaded by wireless communication apparatus 404 to base station 406, and downloaded by base station 406 to AT 402). Additionally, the resource management module 414 can obtain or secure a resource provided by wireless communication apparatus 404 to implement or enhance a task conducted by AT 402. In some aspects, securing the resource can be limited by a number of resource sharing credits associated with AT 402, contingent upon a status of a user-flag stored at wireless communication apparatus 404, a user-flag maintained by decision module 416, or the like. As described herein, a record of shared resources can be maintained by AT 402, along with sharing credits associated with consumption or provision of shared resources by AT 402 (e.g., by a mediation module).

In at least one aspect of the subject disclosure, apparatus 408 can further comprise a reporting module 418. Reporting module 418 can issue a report 420 of shared resources utilized in cooperative communication between AT 402 and wireless communication apparatus 404. The report 420 can specify, for instance, what resources are exchanged, a degree or amount of such exchanged resources, when the exchange occurred, what task is involved in consuming the resources, or the like. Furthermore, the report 420 can specify an amount of credits added to or subtracted from a providing or consuming device 402, 404, respectively. The report 420 can be transmitted by reporting module 418 to base station 406, to facilitate network managed resource sharing, or network tracking of shared resources, or the like. As one particular example, the report 420 can facilitate network-tracking of shared/consumed resources, degree or frequency of cooperative communication, what resources are shared/consumed, etc., for initializing an amount of credits for a particular device 402, 404 upon future network entry.

Figure 5:
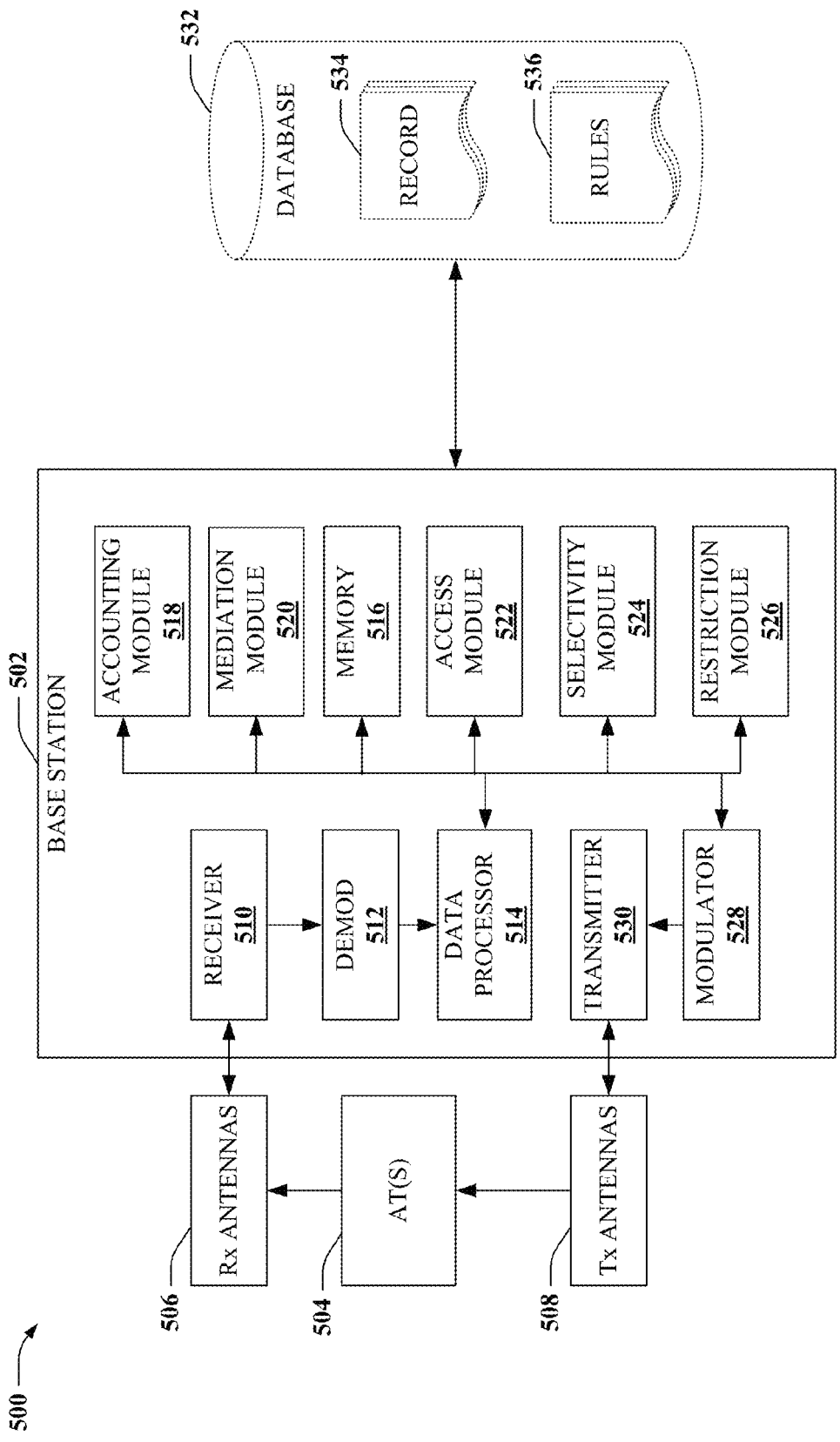
FIG. 5 illustrates a block diagram of an example base station that facilitates resource sharing in a wireless network.

FIG. 5 depicts a block diagram of an example system 500 according to aspects of the subject disclosure. Specifically, system 500 can comprise a base station 502 configured for facilitating resource sharing in cooperative wireless communications. For instance, base station 502 can be configured to obtain resource availability from one or more ATs 504 near to or within a coverage area served by the base station 502. Additionally, base station 502 can facilitate mediating resources for ATs 504 initiating cooperative communications, tracking consumption or provision of resources, allocating and updating resource sharing credits, and so forth. Furthermore, base station 502 can condition implementation of shared resources on subscription information, user-settings, or the like.

Base station 502 (e.g., access point, . . . ) can comprise a receiver 510 that obtains wireless signals from one or more of the ATs 504 through one or more receive antennas 506, and a transmitter 530 that sends coded/modulated wireless signals provided by modulator 528 to the one or more ATs 504 through a transmit antenna(s) 508. Receiver 510 can obtain information from receive antennas 506 and can further comprise a signal recipient (not shown) that receives uplink data transmitted by AT(s) 504. Additionally, receiver 510 is operatively associated with a demodulator 512 that demodulates received information. Demodulated symbols are analyzed by a communication processor 514. Communication processor 514 is coupled to a memory 516 that stores information related to functions provided or implemented by base station 502. In one instance, stored information can comprise rules or protocols for parsing wireless signals and obtaining and decoding a network service request of one or more of the UT(s) 504.

Further to the above, base station 502 can employ an accounting module 518 that initializes and maintains an amount of credits for respective ATs 504 in response to a service request. The amount of credits can be utilized in consuming resources of another AT 504, and can be increased by providing resources for consumption by other such ATs 504. Accounting module 518 can provide an initial amount of credits for an AT 504 upon network entry (e.g., obtaining a service request from the AT 504). The initial amount of credits can be fixed, or variable based on a subscription level, credit usage history, resource sharing history, and so forth. In some aspects of the subject disclosure, the accounting module 518 can initialize respective records 534 for respective ATs 504 in a database 532. The records can store current resource sharing credits for the respective ATs 504. Upon receiving a request for shared resources from a particular AT 504, the accounting module 518 can obtain the current amount of credits stored in a record associated with the particular AT 504, and provide those credits to the AT 504. Alternatively, or in addition, accounting module 518 can govern an amount or duration of shared resource consumption, based on the amount of credits. In some aspects of the subject disclosure, the accounting module 518 can specify what shared resources are available for consumption by the particular AT 504, based on the amount of credits (e.g., where different resources have different credit costs). In at least some aspects of the subject disclosure, accounting module 518 can load the amount of credits into temporary memory (516) to service a shared resource request, and update a new amount of credits to the appropriate record 534 upon completion of the sharing of resources, or upon the particular AT 504 leaving a coverage area served by base station 502.

In addition to the foregoing, base station 502 can comprise a mediation module 520 for updating shared resource credits of respective ATs 504 based on provision or consumption of shared resources. Thus, for instance, where an AT 504 consumes shared resources, mediation module 520 can decrement an amount of credits associated with the consuming AT 504. Likewise, mediation module 520 can increment an amount of shared credits associated with a provisioning AT 504. A running total amount of credits can be maintained in memory 516 for respective ATs 504 by mediation module 520. According to some aspects, mediation component 520 can access a set of rules 536 for defining shared resources, which can include network-assigned wireless channel resources (e.g., timeslot, frequency band, OFDM symbols, CDMA codes), assigned transmit power, licensed network or third party application, network connectivity period, number of processor cycles of an AT 504, memory storage space of an AT 504, or the like.

Further to the above, base station 502 can comprise an access module 522 that can determine whether an AT 504 is associated with a resource sharing subscription. Implementation of resource sharing, therefore, can be conditioned by the access module 522 on existence of such a subscription. According to some aspects, base station 502 can also comprise a selectivity module 524 configured to check a status of a user-flag associated with a particular AT 504, and condition sharing resources with or providing resources of such an AT 504 on a status of the user-flag (e.g., enabled, disabled). Furthermore, in at least one aspect of the subject disclosure, base station 502 can comprise a restriction module 526 that imposes a penalty on an AT 504 for refusing sharing resources in cooperative communication (e.g., based on the status of the user-flag). The penalty can be implemented as a further motivation to enable/participate in resource sharing, and can comprise restricted access to shared resources of other ATs 504 for a time period, decreasing an amount of credits associated with the disabled AT 504, or the like.

Figure 6:
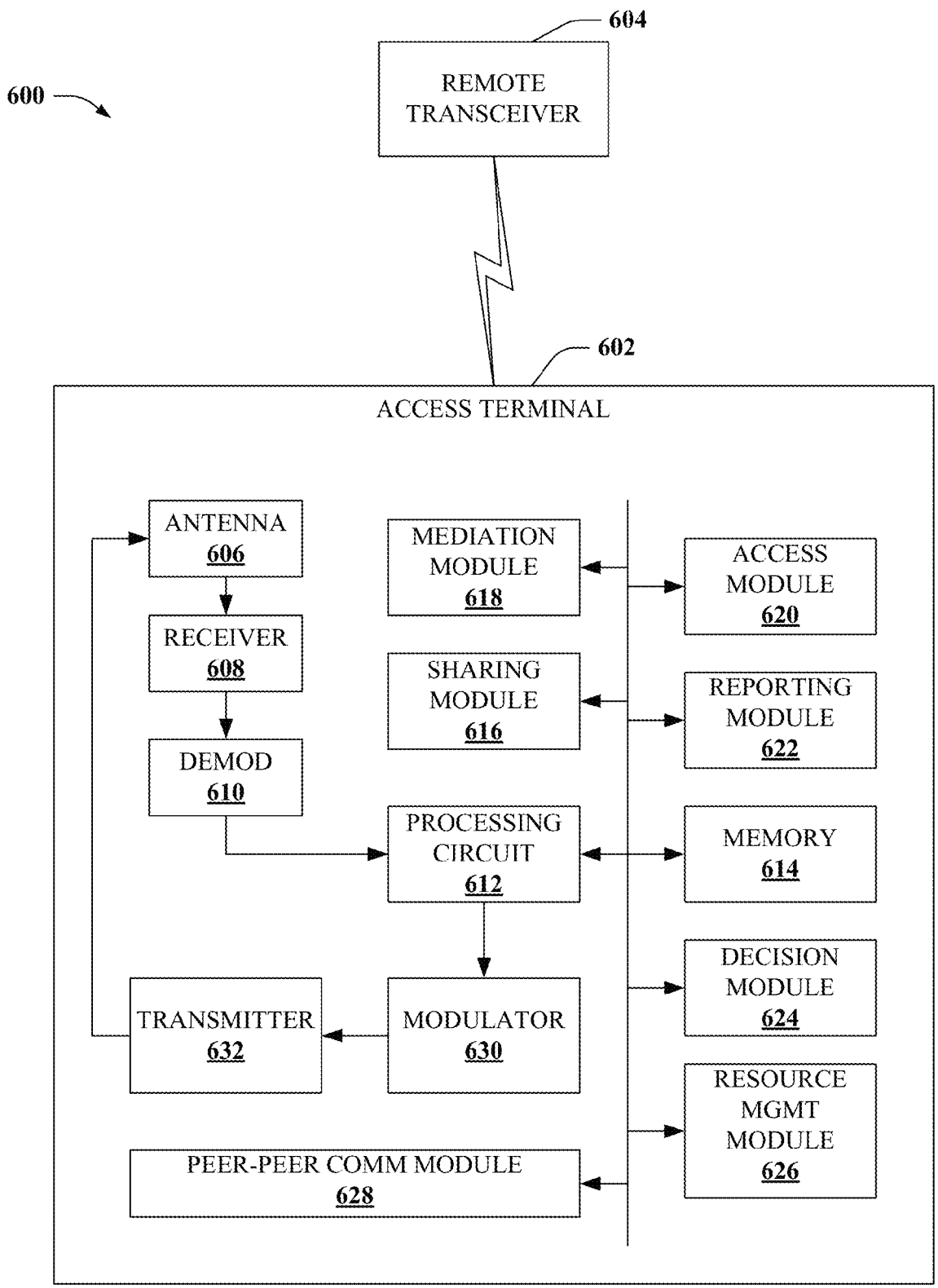
FIG. 6 depicts a block diagram of a sample user terminal configured to implement fair resource sharing according to aspects of the subject disclosure.

FIG. 6 depicts a block diagram of an example system comprising an AT 602 configured for cooperative wireless communication according to aspects of the subject disclosure. AT 602 can be configured to wirelessly couple with one or more remote transceivers 604 (e.g., access point, P-P partner) of a fixed or ad-hoc wireless network. For fixed network communication, AT 602 can receive wireless signals from a base station (504) on a forward link channel and respond with wireless signals on a reverse link channel. Alternatively, or in addition, for peer-to-peer (P-P) communication AT 602 can receive wireless signals from a remote P-P partner (504) on the forward link channel or reverse link channel, and respond with wireless signals on the reverse link channel or forward link channel, respectively. In addition, AT 602 can comprise instructions stored in memory 614 for employing resources of a disparate wireless node in accomplishing tasks, for providing resources of the AT 602 to other such nodes, for tracking consumption or provision of shared resources, or for reporting shared resource utilization to a remote transceiver 604 (e.g., partner AT or network base station), as described herein.

AT 602 includes at least one antenna 606 (e.g., a wireless transmission/reception interface or group of such interfaces comprising an input/output interface) that receives a signal and receiver(s) 608, which performs typical actions (e.g., filters, amplifies, down-converts, etc.) on the received signal. In general, antenna 606 and a transmitter 632 (collectively referred to as a transceiver) can be configured to facilitate wireless data exchange with remote transceiver(s) 604.

Antenna 606 and receiver(s) 608 can also be coupled with a demodulator 610 that can demodulate received symbols and provide such signals to a processing circuit(s) 612 for evaluation. It should be appreciated that processing circuit(s) 612 can control and/or reference one or more components (606, 608, 610, 614, 616, 618, 620, 622, 624, 626, 628, 630) of the AT 602. Further, processing circuit(s) 612 can execute one or more modules, applications, engines, or the like (616, 618, 620, 622, 624, 626, 628, 630) that comprise information or controls pertinent to executing functions of the AT 602. For instance, such functions can include sharing resources in cooperative communication with remote transceiver 604, and tracking the shared resources. In addition, functions can include updating an amount of credits for the AT 602 or remote transceiver 604 based on the cooperative communication, reporting the shared resources or updated credits to a network entity, or like operations, as described herein.

Additionally, the memory 614 of AT 602 is operatively coupled to processing circuit(s) 612. Memory 614 can store data to be transmitted, received, and the like, and instructions suitable to conduct wireless communication with a remote device (504). Specifically, the instructions can be utilized to implement cooperative communication, resource sharing, and implementing fairness in conjunction there with, as described herein. Further, memory 614 can store the modules, applications, engines, etc. (616, 618, 620, 622, 624, 626, 628, 630) executed by processing circuit(s) 612, above.

According to particular aspects, AT 602 can comprise a sharing module 616 for identifying, providing or receiving sharable resources in conjunction with cooperative wireless communication with remote transceiver 604. Further, a mediation module 618 can be employed to update an amount of credits based on consuming or providing sharable resources, as described herein. To initiate the cooperative communication, an access module 620 can be employed to submit a request to utilize a resource of the remote transceiver. The access module 620 can base the request on a desired or optimal amount of resources in accomplishing a task, compared with resources currently available to AT 602. In some aspects, submitting the request can further be conditioned on a status of a user-flag maintained by a decision module 624.

According to further aspects, AT 602 can comprise a resource management module 626 for allocating sharable resources associated with AT 602 for consumption by other wireless devices (e.g., subject to the state of the user-flag). In some aspects, e.g., where remote transceiver 604 is another AT or other suitable peer device, a peer-to-peer communication module 628 can be employed to create a wireless channel with the remote transceiver 604 to facilitate the shared communication, as described herein. As described above, shared resources can be tracked and consumption/provision of such resources can be reflected in an amount of sharing credits associated with respective cooperative devices 602, 604. By increasing or decreasing credits based on such sharing or consuming, respectively, AT 602 can facilitate fairness in resource sharing, to encourage widespread participation in cooperative wireless communications.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include AT 602, base station 502, and wireless communication apparatus B 204, or a different combination of these or other components. Sub-components could also be implemented as components communicatively coupled to other components rather than included within parent components. Additionally, it should be noted that one or more components could be combined into a single component providing aggregate functionality. For instance, access module 412 can include decision module 416, or vice versa, to facilitate submitting a shared resource request and conditioning resource sharing on a status of a user-flag by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 7:
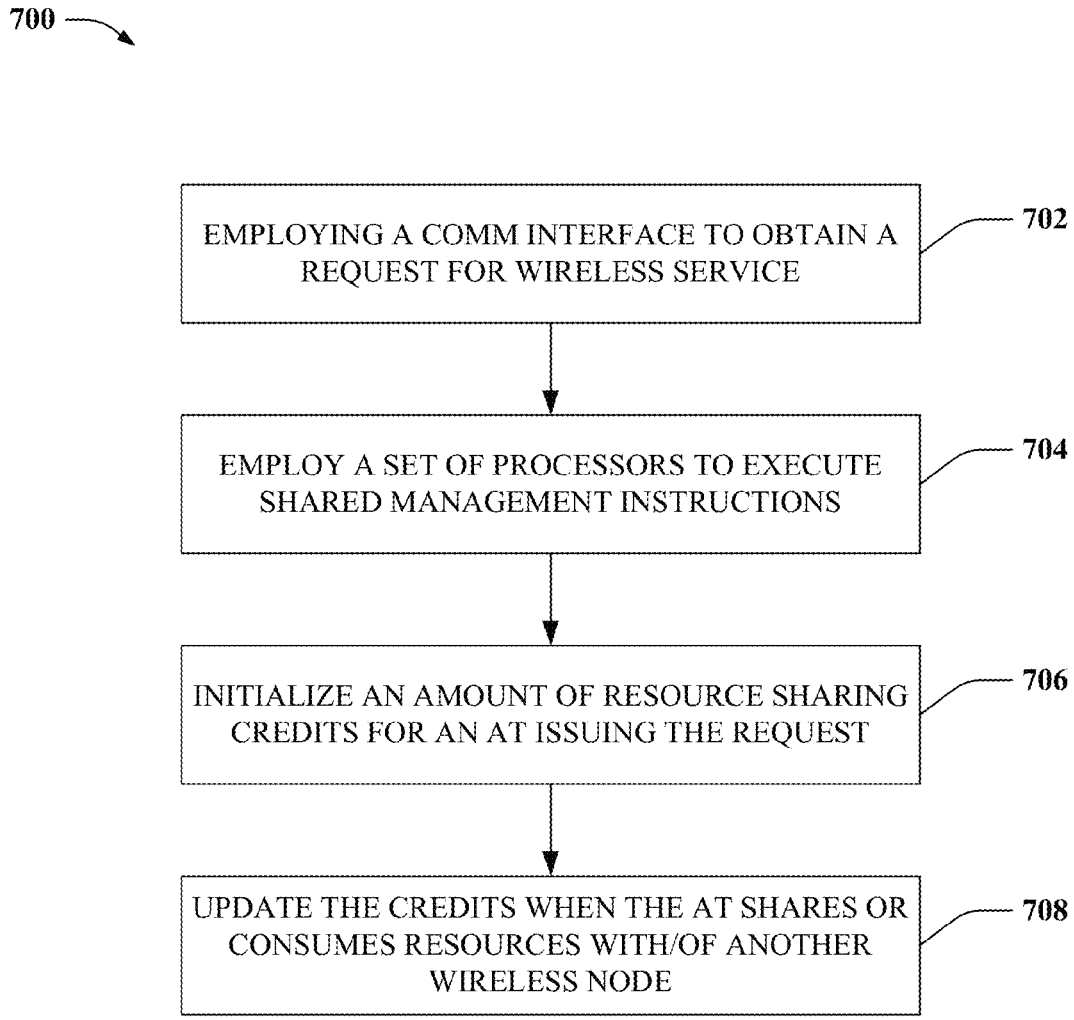
FIG. 7 depicts a flowchart of an example methodology for implementing fair resource sharing in a wireless environment according to one or more aspects.

FIG. 7 illustrates a flowchart of an example methodology 700 for providing fair resource sharing in cooperative wireless communication according to aspects of the subject disclosure. At 702, method 700 can employ a communication interface (e.g., a wireless communication interface) to obtain a request for wireless services. The request can be initiated by a wireless communication apparatus. Furthermore, the wireless communication apparatus can be within a coverage area of a network base station, which provides wireless communication services for a wireless network. In some aspects, the request can specify an ID of a requesting device, where the ID can be utilized to reference a network subscription of the requesting device.

At 704, method 700 can employ a set of processors to execute shared resource management instructions on behalf of the requesting device. The instructions can be configured to identify whether the requesting device is associated with a shared resource subscription for cooperative wireless communications, in some instances. Furthermore, the instructions can be configured to determine whether a user-flag enables shared resources in other aspects. At 706, method 700 can initialize an amount of shared resource credits for the requesting device. The shared resource credits can be a fixed number, or a variable number based on one or more suitable factors. In one example, the factors can include a subscription level corresponding with the requesting device, credit history associated with the requesting device, resource sharing history of the requesting device, and so forth.

Further to the above, at 708, method 700 can update the amount of credits when the requesting device shares resources with, or consumes resources of, another wireless node in cooperative wireless communications. As an example, updating the amount of credits can comprise increasing the amount when the requesting device provides resources for the other wireless node to consume. As another example, updating the amount of credits can comprise decreasing the amount when the requesting device consumes resources provided by the other wireless node. In still other examples, a combination of the foregoing can be implemented. As described, method 700 can facilitate fair resource sharing, by correlating an amount of shared resources available for consumption, with an amount of shared resources provided for consumption. It should be appreciated that consuming and providing resources can be in conjunction with one or more specified wireless nodes, or unspecified wireless nodes of a wireless network. Furthermore, an amount of credits can be weighted based on a particular resource shared, or current demand conditions of the particular resource within the wireless network.

Figure 8:
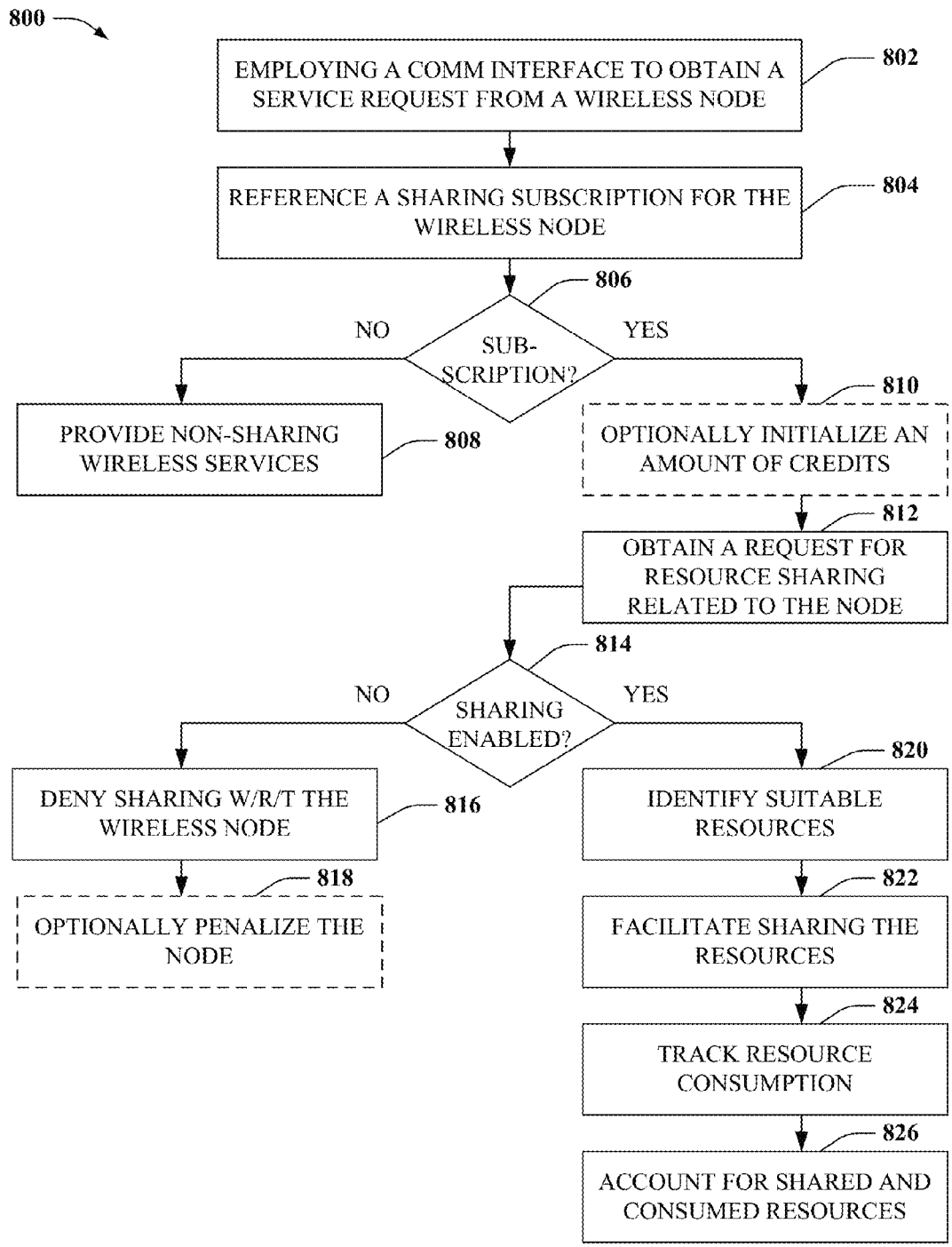
FIG. 8 illustrates a flowchart of a sample methodology for determining availability of resource sharing for select wireless nodes according to some aspects.

FIG. 8 depicts a flowchart of a sample methodology 800 for implementing cooperative communication according to a fairness protocol. At 802, method 800 can employ a communication interface to obtain a service request from a wireless node. At 804, method 800 can reference a resource sharing subscription for the wireless node in conjunction with the service request. At 806, a determination can be made as to whether the wireless node is associated with a suitable resource sharing subscription. If so, method 800 can proceed to 810; otherwise, method 800 proceeds to 808, where non-sharing wireless services are provided to the wireless node in response to the service request.

At 810, method 800 can optionally initialize an amount of credits for the wireless node, based on the service request. At 812, method 800 can obtain a request for shared resources related to the wireless node. At 814, a decision is made as to whether sharing is enabled for the wireless node, or for other suitable nodes capable of providing resources to the wireless node in conjunction with cooperative wireless communications. If sharing is enabled for such node(s), method 800 can proceed to 820; otherwise, method 800 proceeds to 816.

At 816, method 800 can deny sharing with respect to the wireless node, if sharing is not enabled by the node or suitable other nodes of a wireless network. Such decision can also be based on whether any suitable nodes exist to provide shared resources. At 818, method 800 can optionally penalize a node for denying shared resources to the wireless node. The penalty can comprise decreasing an amount of sharing credits associated with the denying node, restricting the denying node from receiving shared resources for a penalty period, or the like.

At 820, method 800 can identify suitable resources for the cooperative communication. Suitable resources can be identified based on a type of task associated with the sharing request, an amount of credits available to the wireless node requesting shared resources, and so on. At 822, method 800 can facilitate sharing the resources (if, e.g., suitable resources or nodes can be identified). At 824, method 800 can track resource consumption by the wireless node in conjunction with cooperative communication. At 826, method 800 can account for shared and consumed resources, for instance by incrementing an amount of credits for a wireless node providing the shared resources, and decrementing an amount of credits associated with the wireless node consuming the shared resources.

Figure 9:
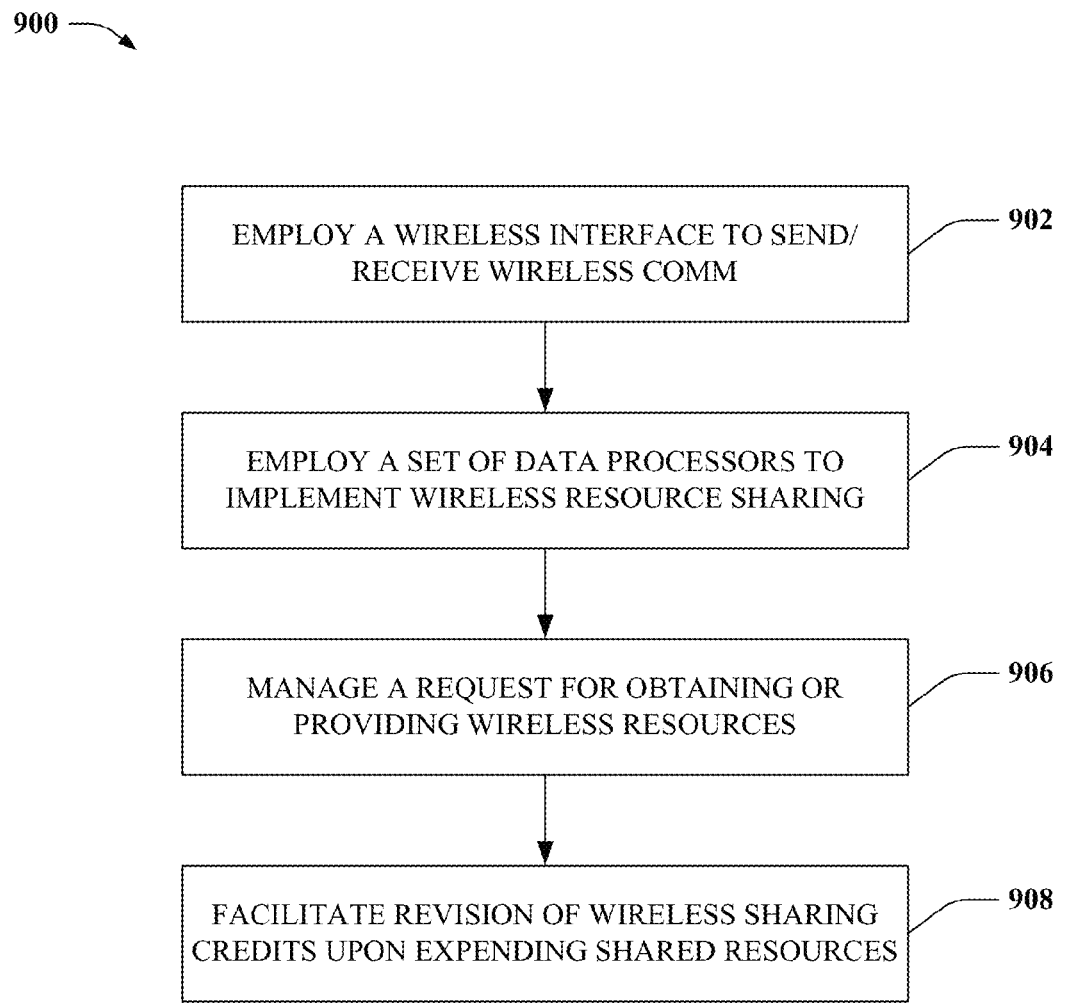
FIG. 9 depicts a flowchart of an example methodology for facilitating fair resource sharing among wireless nodes according to further aspects.

FIG. 9 depicts a flowchart of a sample methodology 900 for facilitating resource sharing in cooperative communications. At 902, method 900 can employ a wireless interface to send or receive wireless communications with at least one wireless communication apparatus. At 904, method 900 can employ a set of data processors to implement wireless resource sharing with at least one of the wireless communication apparatuses. The resource sharing can employ network communication (e.g., with a base station) for network-facilitated resource sharing, or peer-to-peer communication for peer-facilitated resource sharing, or a suitable combination thereof.

At 906, method 900 can manage a request for obtaining or providing wireless resources. As an example, managing the request can comprise approving or denying a request to consume a wireless resource. Alternatively, or in addition, managing the request can comprise approving or denying initiation of a request to consume wireless resources. At 908, method 900 can facilitate revision of wireless sharing credits upon expending or providing shared resources, as described herein. The facilitating can further comprise tracking and updating the sharing credits for wireless nodes participating in the shared communication. Alternatively, or in addition, the facilitating can comprise submitting a report of consumed/provided resources to a network entity for network management of resource sharing credits.

Figure 10:
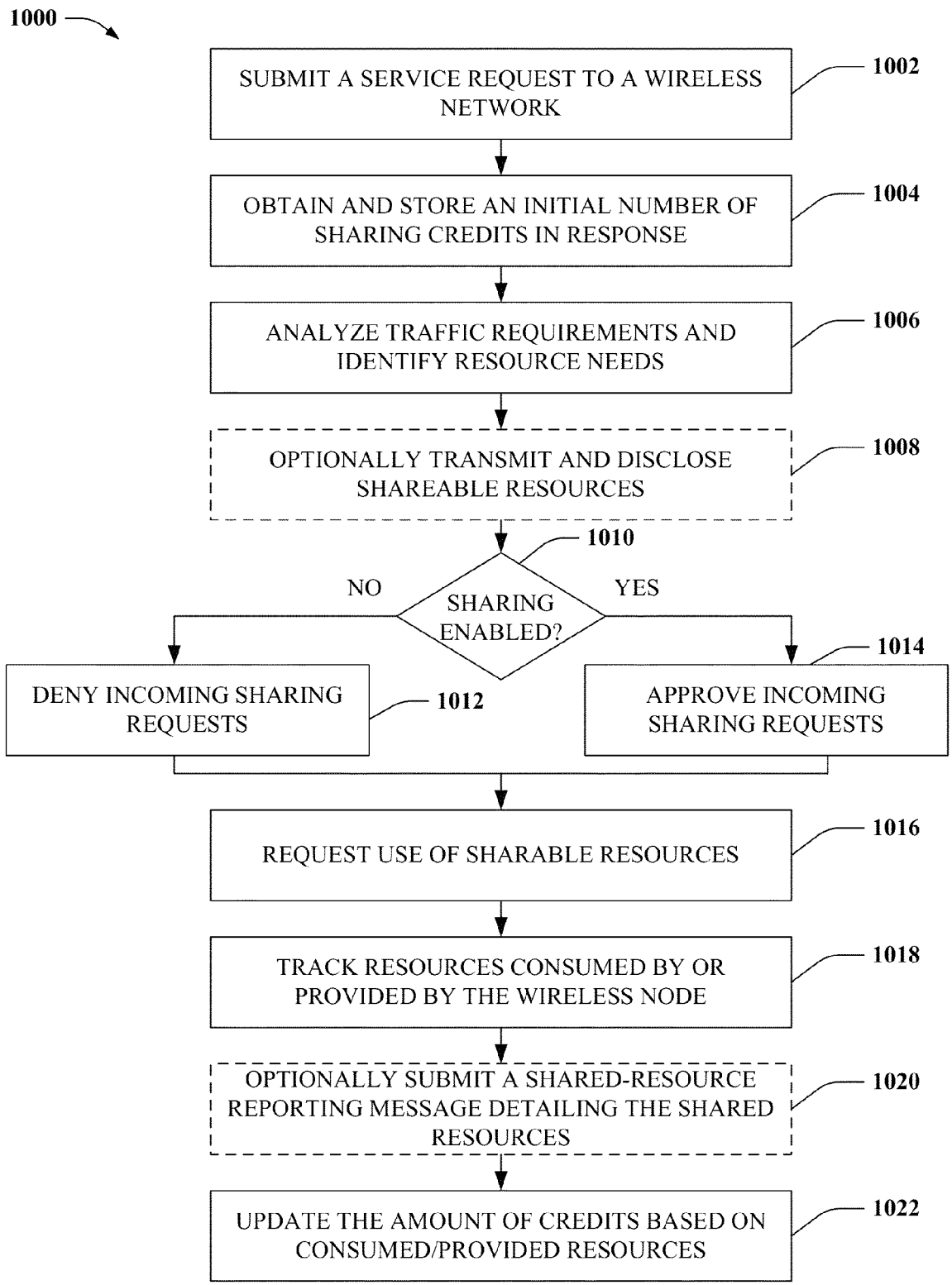
FIG. 10 depicts a flowchart of an example methodology for implementing peer-to-peer resource sharing in a wireless network.

FIG. 10 depicts a flowchart of an example methodology 1000 for facilitating cooperative wireless communications according to fairness protocols. At 1002, method 1000 can submit a service request to a wireless network. At 1004, method 1000 can obtain and store an initial number of resource sharing credits in response to the service request. At 1006, method 1000 can analyze traffic requirements of a task and identify resource needs. At 1008, method 1000 can optionally transmit and disclose sharable resources of a wireless communication apparatus implementing the task. At 1010, a decision can be made as to whether resource sharing is enabled. If so, method 1000 can proceed to 1014, otherwise method 1000 proceeds to 1012.

At 1012, method 1000 can deny incoming sharing requests, and proceed to 1016. At 1014, method 1000 can approve one or more incoming sharing requests, optionally based on a number of credits of a requesting wireless communication apparatus, availability of a requested resource, or the like. At 1016, method 1000 can request use of sharable resources from one or more neighboring wireless communication apparatuses. At 1018, method 1000 can track resources consumed or provided in conjunction with cooperative wireless communication. At 1020, method 1000 can optionally submit a shared-resource reporting message to an unbiased wireless communication apparatus, detailing consumption or provision of shared resources. At 1022, method 1000 can update an amount of credits for the cooperative wireless communication based on resources consumed or provided in relation to such communication.

Figure 11:
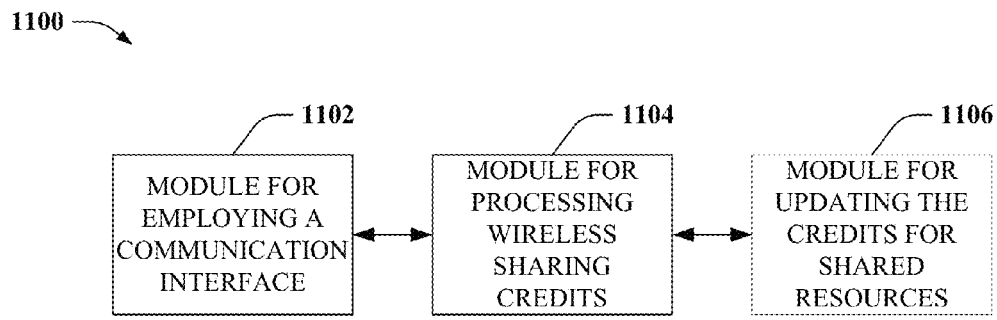
FIGS. 11 and 12 depict block diagrams of example apparatuses for implementing and facilitating, respectively, fair resource sharing wireless networks.
Figure 12:
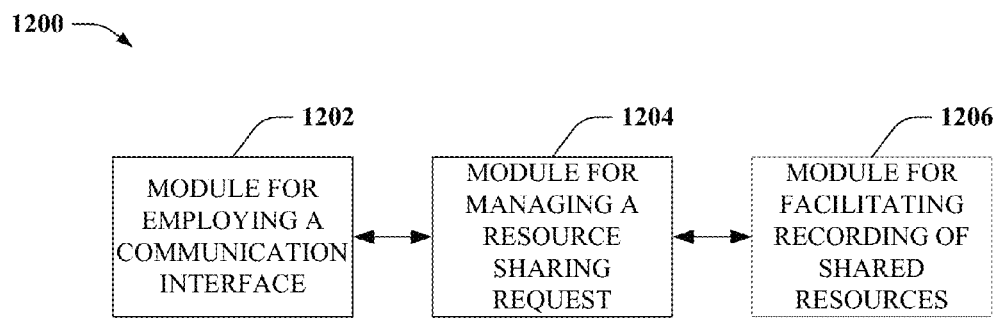

FIGS. 11 and 12 depict block diagrams of example systems 1100, 1200 for implementing and facilitating, respectively, resource sharing in cooperative wireless communication based on fairness rules, according to aspects of the subject disclosure. For example, systems 1100 and 1200 can reside at least partially within a wireless communication network and/or within a transmitter such as a node, base station, access point, user terminal, personal computer coupled with a mobile interface card, or the like. It is to be appreciated that systems 1100 and 1200 are represented as including functional blocks, which can be functional blocks that represent functions implemented by a processor, software, or combination thereof (e.g., firmware).

System 1100 can comprise a first module 1102 for employing a wireless communication interface. Such interface can be utilized in conjunction with exchanging data with one or more other wireless communication systems (not shown). Additionally, system 1100 can comprise a second module 1104 for processing wireless sharing credits provided or consumed in conjunction with cooperative wireless communications. The processing can comprise initializing and maintaining a record of consumed or provided resources for the cooperative communications. Furthermore, the processing can comprise separate records for separate devices involved in the communications, and store an amount of credits associated with the respective devices. In addition to the foregoing, system 1100 can comprise a third module 1106 for updating the amount of credits based on resources employed in the cooperative communications. Updating can comprise increasing an amount of credits for a device providing shared resources, or decreasing an amount of credits for a device consuming shared resources, or both.

System 1200 can comprise a first module 1202 for employing a wireless communication interface in wireless data exchange. Additionally, the system 1200 can comprise a second module 1204 for managing resource sharing requests. The second module 1204 can approve or deny a request for providing a shared resource by system 1200, or can approve or deny a request by system 1200 to consume a shared resource of a wireless node. The decision to approve or deny a request can be based on an amount of resource sharing credits available to a requesting device. Additionally, or in the alternative, the decision to approve or deny the request can be based on a user-flag associated with a respective device. For instance, if a state of the user-flag enables resource sharing, the request can be approved. Conversely, if the state of the user-flag disables resource sharing, the request can be denied. Furthermore, system 1200 can comprise a third module 1206 for facilitating recording of shared resources. The recording can comprise maintaining a record of consumption or provision of resources in conjunction with cooperative communication. In some instances, the recording can comprise updating an amount of resource sharing credits associated with a wireless node providing or consuming the resources, respectively, as described herein.

Figure 13:
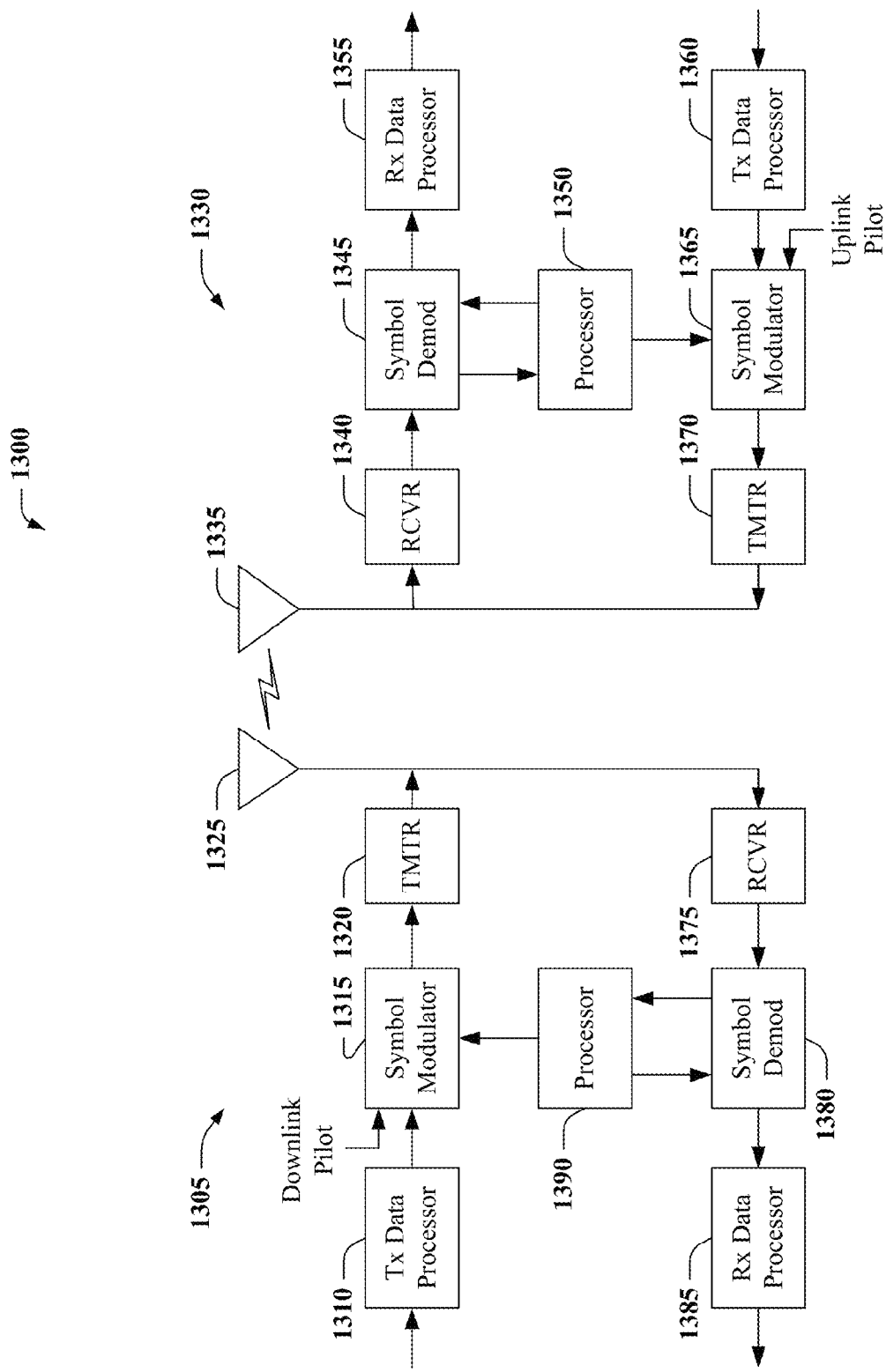
FIG. 13 illustrates a block diagram of an example apparatus that provides wireless communications between remote devices.

FIG. 13 depicts a block diagram of an example system 1300 that can facilitate wireless communication according to some aspects disclosed herein. On a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1320 multiplexes data and pilot symbols and provides them to a transmitter unit (TMTR) 1320. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305. Specifically, the uplink signal can be in accordance with SC-FDMA requirements and can include frequency hopping mechanisms as described herein.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals can transmit pilot concurrently on the uplink on their respective assigned sets of pilot subbands, where the pilot subband sets can be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot subbands can be shared among different terminals. The channel estimation techniques can be used in cases where the pilot subbands for each terminal span the entire operating band (possibly except for the band edges). Such a pilot subband structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1390 and 1350.

Figure 14:
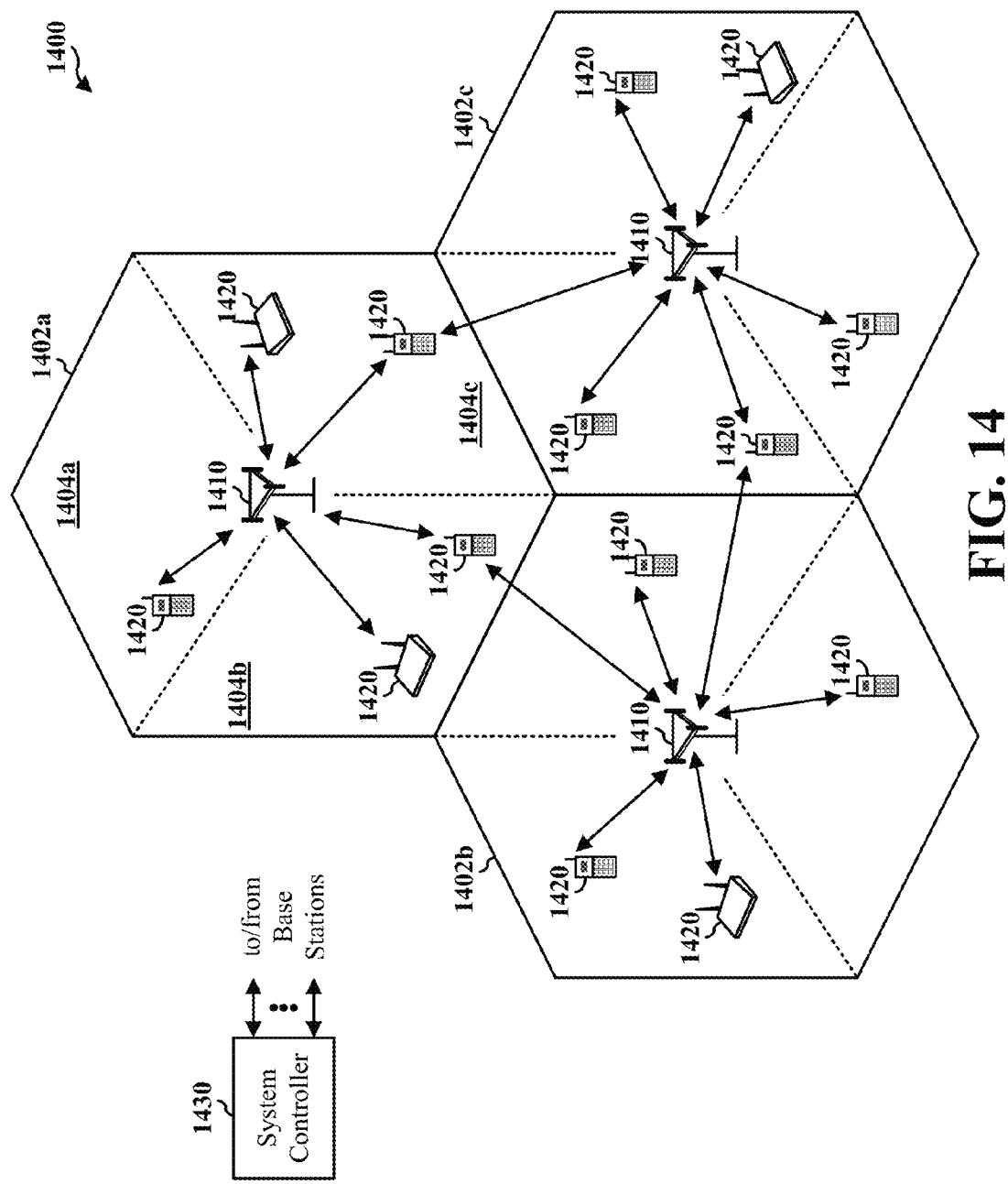
FIG. 14 depicts a block diagram of an example mobile communication environment according to aspects of the subject disclosure.

FIG. 14 illustrates a wireless communication system 1400 with multiple base stations (BSs) 1410 (e.g., wireless access points, wireless communication apparatus) and multiple terminals 1420 (e.g., ATs), such as can be utilized in conjunction with one or more aspects. A BS (1410) is generally a fixed station that communicates with the terminals and can also be called an access point, a Node B, or some other terminology. Each BS 1410 provides communication coverage for a particular geographic area or coverage area, illustrated as three geographic areas in FIG. 14, labeled 1402*a*, 1402*b*, and 1402*c*. The term "cell" can refer to a BS or its coverage area depending on the context in which the term is used. To improve system capacity, a BS geographic area/coverage area can be partitioned into multiple smaller areas (e.g., three smaller areas, according to cell 1402*a* in FIG. 14), 1404*a*, 1404*b*, and 1404*c*. Each smaller area (1404*a*, 1404*b*, 1404*c*) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with unsectorized cells. For simplicity, in the subject description, unless specified otherwise, the term "base station" is used generically for a fixed station that serves a sector as well as a fixed station that serves a cell.

Terminals 1420 are typically dispersed throughout the system, and each terminal 1420 can be fixed or mobile. Terminals 1420 can also be called a mobile station, user equipment, a user device, wireless communication apparatus, or some other terminology. A terminal 1420 can be a wireless device, a cellular phone, a personal digital assistant (PDA), a wireless modem card, and so on. Each terminal 1420 can communicate with zero, one, or multiple BSs 1410 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1430 couples to base stations 1410 and provides coordination and control for BSs 1410. For a distributed architecture, BSs 1410 can communicate with one another as needed (e.g., by way of a wired or wireless backhaul network communicatively coupling the BSs 1410). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 15:
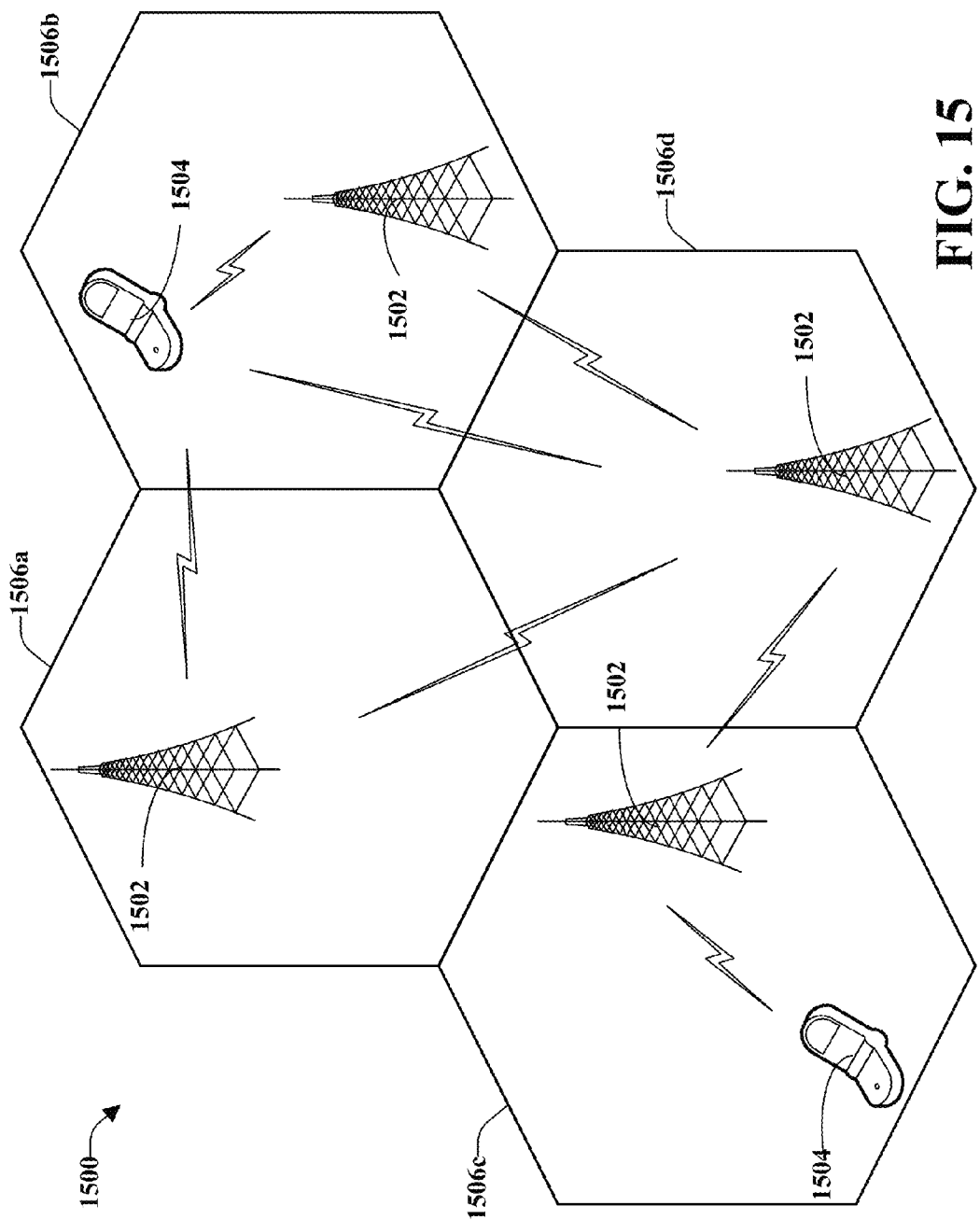
FIG. 15 illustrates a block diagram of an example cellular communication environment according to at least one aspect of the subject disclosure.

FIG. 15 is an illustration of a planned or semi-planned wireless communication environment 1500, in accordance with various aspects. System 1500 can comprise one or more BSs 1502 in one or more cells and/or sectors that receive, transmit, repeat, etc., wireless communication signals to each other and/or to one or more mobile devices 1504. As illustrated, each BS 1502 can provide communication coverage for a particular geographic area, illustrated as four geographic areas, labeled 1506*a*, 1506*b*, 1506*c* and 1506*d*. Each BS 1502 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 5), as will be appreciated by one skilled in the art. Mobile devices 1504 can be, for example, cellular phones, smart phones, laptops, handheld communication devices, handheld computing devices, satellite radios, global positioning systems, PDAs, or any other suitable device for communicating over wireless network 1500. System 1500 can be employed in conjunction with various aspects described herein in order to facilitate providing fairness in conjunction with shared resources in cooperative wireless communications, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UT. A UT can also be called a system, a subscriber unit, a subscriber station, mobile station, mobile, mobile communication device, mobile device, remote station, remote terminal, access terminal (AT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive ... ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for sharing resources in a wireless network, comprising:
   obtaining, at a base station, a network service request from a first wireless apparatus;
   determining, at the base station, an amount of credits for shared resource management of the first wireless apparatus in the wireless network;
   determining whether to restrict access of the first wireless apparatus to resources shared by a second wireless apparatus based in part on the amount of credits; and
   updating, at the base station, the amount of credits based on determining sharing of other resources by the first wireless apparatus with one or more other wireless apparatuses.

2. The method of claim 1, further comprising providing the amount of credits to the first wireless apparatus upon entry into the wireless network.

3. The method of claim 2, wherein the providing the amount of credits is based in part on a subscription level, a credit history, or a credit sharing history of the first wireless apparatus.

4. The method of claim 1, wherein the determining whether to restrict access is based in part on comparing the amount of credits to a threshold amount of credits and comprises determining to restrict access where the amount of credits is less than the threshold amount of credits.

5. The method of claim 4, wherein the threshold amount of credits is based in part on a demand for at least a portion of the resources shared by the second wireless apparatus.

6. The method of claim 1, wherein determining whether to restrict access is further based in part on determining whether the first wireless apparatus is associated with a resource sharing subscription and comprises determining to restrict access when the first wireless apparatus is not associated with the resource sharing subscription.

7. The method of claim 1, further comprising decreasing the amount of credits when the first wireless apparatus refuses to share resources with another wireless apparatus.

8. The method of claim 1, wherein the network service request indicates resources of the second wireless apparatus for utilizing in the shared resource management.

9. An apparatus that facilitates sharing resources in a wireless network, comprising:
- a receiver for obtaining, at a base station, a network service request from a first wireless apparatus;
- an accounting module for determining, at the base station, an amount of credits for shared resource management of the first wireless apparatus in the wireless network;
- a restriction module for determining whether to restrict access of the first wireless apparatus to resources shared by a second wireless apparatus based in part on the amount of credits; and
- a mediation module for updating the amount of credits based on determining sharing of other resources by the first wireless with one or more other wireless apparatuses.

10. The apparatus of claim 9, wherein the accounting module initializes the amount of credits upon entry of the first wireless apparatus into the wireless network.

11. The apparatus of claim 10, wherein the accounting module initializes the amount of credits based in part on a subscription level, a credit history, or a credit sharing history of the first wireless apparatus.

12. The apparatus of claim 9, wherein the restriction module determines whether to restrict access based in part on comparing the amount of credits to a threshold amount of credits, comprising determining to restrict access where the amount of credits is less than the threshold amount of credits.

13. The apparatus of claim 12, wherein the threshold amount of credits is based in part on a demand for at least a portion of the resources shared by the second wireless apparatus.

14. The apparatus of claim 9, wherein the restriction module determines whether to restrict access further based in part on determining whether the first wireless apparatus is associated with a resource sharing subscription, comprising determining to restrict access when the first wireless apparatus is not associated with the resource sharing subscription.

15. The apparatus of claim 9, wherein the restriction module further decreases the amount of credits when the first wireless apparatus refuses to share resources with another wireless apparatus.

16. The apparatus of claim 9, wherein the network service request indicates resources of the second wireless apparatus for utilizing in the shared resource management.

17. An apparatus that facilitates sharing resources in a wireless network, comprising:
- means for obtaining, at a base station, a network service request from a first wireless apparatus;
- means for determining, at the base station, an amount of credits for shared resource management of the first wireless apparatus in the wireless network;
- means for determining whether to restrict access of the first wireless apparatus to resources shared by a second wireless apparatus based in part on the amount of credits; and
- means for updating, at the base station, the amount of credits based on determining sharing of other resources by the first wireless apparatus with one or more other wireless apparatuses.

18. A computer program product, comprising:
a computer-readable medium, comprising:
a first set of codes for obtaining, at a base station, a network service request from a first wireless apparatus;
a second set of codes for determining, at the base station, an amount of credits for shared resource management of the first wireless apparatus in a wireless network;
a third set of codes for determining whether to restrict access of the first wireless apparatus to resources shared by a second wireless apparatus based in part on the amount of credits; and
a fourth set of codes for updating, at the base station, the amount of credits based on determining sharing of other resources by the first wireless apparatus with one or more other wireless apparatuses.

* * * * *